(12) United States Patent
Gridley

(10) Patent No.: US 8,220,474 B2
(45) Date of Patent: *Jul. 17, 2012

(54) VENTILATOR FOR VENTING COVERS WITH IMPROVED AIR FLOW

(76) Inventor: William Gridley, Waukesha, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/090,444

(22) Filed: Apr. 20, 2011

(65) Prior Publication Data

US 2011/0192436 A1    Aug. 11, 2011

Related U.S. Application Data

(62) Division of application No. 12/400,952, filed on Mar. 10, 2009.

(60) Provisional application No. 61/059,757, filed on Jun. 7, 2008, provisional application No. 61/035,345, filed on Mar. 10, 2008.

(51) Int. Cl.
*E04H 15/16* (2006.01)
*F24F 13/20* (2006.01)

(52) U.S. Cl. ............ 135/94; 135/98; 135/135; 135/147; 135/119; 52/63; 454/368

(58) Field of Classification Search ............ 135/91, 135/93–94, 124, 135, 147, 119, 905; 52/111, 52/114, 118, 126.6, 63; 454/250, 367–368
See application file for complete search history.

(56) References Cited

U.S. PATENT DOCUMENTS

| | | | | |
|---|---|---|---|---|
| 2,314,830 | A | * | 3/1943 | Hunter ........................... 135/93 |
| 3,561,174 | A | * | 2/1971 | Schneidler ..................... 52/2.14 |
| 4,148,332 | A | * | 4/1979 | Huddle ......................... 135/123 |
| 4,379,468 | A | * | 4/1983 | Szukhent, Jr. ............. 135/88.01 |
| 4,844,108 | A | * | 7/1989 | Rohrer .......................... 135/91 |
| 4,949,928 | A | * | 8/1990 | Hoshino .................... 248/291.1 |
| 5,036,874 | A | * | 8/1991 | Lynch ........................... 135/99 |
| 6,152,434 | A | * | 11/2000 | Gluck ............................ 269/6 |
| 6,345,639 | B2 | * | 2/2002 | Rousselle et al. ............ 135/128 |
| 6,523,558 | B1 | * | 2/2003 | Gillis ............................ 135/87 |
| 6,938,631 | B2 | * | 9/2005 | Gridley .......................... 135/94 |
| 7,044,145 | B2 | * | 5/2006 | Bouchard ...................... 135/98 |
| 7,607,447 | B1 | * | 10/2009 | Han ............................. 135/135 |

* cited by examiner

*Primary Examiner* — Winnie Yip
(74) *Attorney, Agent, or Firm* — Monty Simmons; Simmons Patents

(57) ABSTRACT

Disclosed is an improved ventilator apparatus for covers. The apparatus comprises a dome section that is associated with a first ventilator plate on the outside of a vehicle cover. The Dome section extends through the vehicle cover where it is associated with a second ventilator plate. A nut is used to releaseably associate the component pieces together so that a portion of the vehicle cover is clamped between the first ventilator plate and the second ventilator plate. Both the first ventilator plate and second ventilator plate are interchangeable so that either plate may be used on the inside or outside of the cover.

11 Claims, 33 Drawing Sheets

VENTILATOR FOR VENTING COVERS WITH IMPROVED AIR FLOW

CLAIM TO PRIORITY

This application is a divisional of application Ser. No. 12/400,952, filed on Mar. 10, 2009, and claims priority to application Ser. No. 29/385,453, filed on Feb. 14, 2011, which claims priority to application Ser. No. 12/400,952, which claims priority to provisional application 61/059,757 filed on Jun. 7, 2008, and provisional application 61/035,345 filed on Mar. 10, 2008, the entire contents of which are incorporated herein by this reference for all that they disclose.

FIELD OF THE INVENTION

Embodiments of the present relate in general to the field of ventilator apparatus and in particular to ventilator apparatus adapted to be used with a vehicle cover for items such as boats, automobiles, and any other object that is protected from the elements by the covering. Other embodiments of the invention relate in general to the field of adjustable poles for supporting items such as tents, boat covers, and canvas covers.

BACKGROUND OF THE INVENTION

Recreational vehicles such as boats and travel trailers are typically stored outdoors when not in use. Often, a cover is placed over the entire vehicle in order to protect it from elements of the weather such as rain, snow, sleet, ultraviolet rays, heat from direct sunlight, as well as dirt and dust from the outside air. In this regard, a simple cover is quite effective and yet an inexpensive alternative to indoor storage. In the prior art, the covers can comprise canvas, plastic and other generally non-porous materials. Obviously, a non-porous cover functions very well for its intended purpose. Neither dirt nor rain can penetrate the non-porous material and as a result the recreational vehicle is fairly well protected when not in use.

One problem with using a porous or non porous cover to protect a vehicle is moisture and mildew resulting from condensation and other sources. In a completely non porous cover, the condensation, in the form of moisture, is trapped inside the cover where it can penetrate every unsealed surface of the covered vehicle and every electrical, mechanical and fabric component in the vehicle. In a very real sense, the trapped moisture is more damaging than the vehicle being left uncovered. An uncovered vehicle can dry out, but a covered vehicle with moisture trapped therewithin does not dry out and the vehicle is constantly exposed to the moisture which over a shortened period of time can cause a significant amount of damage.

The newer, breathable prior art materials allow some of the trapped moisture to escape, but not completely. Even with the breathable materials, moisture remains trapped inside the cover for a longer period of time than it would if the cover were removed and the vehicle allowed to air dry. It is to be noted that the moisture problem is not necessarily exclusive to the outdoors. Indeed, indoor storage, for example, where the air is not conditioned or otherwise dry, can experience high humidity. In such an environment, the moist air can damage a covered object or vehicle by becoming trapped under the cover.

In a commonly owned U.S. Patent issued to Gridley (U.S. Pat. No. 6,938,631, incorporated by this reference for all that it discloses) on Sep. 6, 2005, the applicant disclosed a new apparatus for venting a cover covering a vehicle. Such ventilation apparatus was configured so that so that air can freely pass in and out of the space inside of the cover.

While the applicant's prior art ventilation apparatus works well for its intended purposes, novel improvements to the apparatus have been developed and are disclosed herein.

To prevent water from pooling up on top of a boat cover (for example), the cover is typically supported by a support structure such as a pole. Prior devices used to support boat covers require both hands to adjust the height of the pole by holding the pole with one hand and turning a thumb screw with the other. Such a prior art configurations are awkward, heavier than necessary and more complex to use than need be.

What is needed is a new light weight support structure that can be easily adjusted to the desired height and secured in place using one hand.

Another needed improvement for a cover support structure is remote operation. Crawling under a cover and manually extending an adjustable support structure can be quite annoying, especially at the end of a long day. What is needed is an adjustable support structure that can be extended from a remote location (remote from the support structure—e.g. the side of a boat away from a support pole).

Another needed improvement concerns electronic features. Covers can fail, the climate changes, and the location of the cover may change. As a result, the environment under a cover continually changes for many reasons. Some environmental conditions may be undesirable and need to be "corrected." What is needed is a cover vent and/or support structure device that can monitor the cover and its environment to detect a predefined condition and perform a predefined task upon detection. Additional electronic features would include services such as tamper detection and theft detection.

SUMMARY OF THE INVENTION

Some of the objects and advantages of the invention will now be set forth in the following description, while other objects and advantages of the invention may be obvious from the description, or may be learned through practice of the invention.

The inventive ventilation device comprises a component assembly including a dome member, a first ventilator plate, a second ventilator plate and a nut. A simple hole of a predetermined size is made in the cover material and the ventilation device is associated with such hole. When covering a vehicle, the ventilation apparatus may be used with a pole to raise the cover up and away from the vehicle surface to enhance the circulation of air.

The dome comprises a top section and a depending shaft section. With a first ventilator plate already associated with the dome's top section, the depending base is fitted into the hole in the cover so that a first cover surface (the "outside" surface of the cover) is associated with a surface of the first ventilator plate. Next, a second ventilator plate is associated with the depending base from underneath the cover so that a second side of the cover (the "inside" surface of the cover) is associates with a surface of the second ventilator plate. A nut is then threaded onto the shaft to clamp the cover between the ventilator plates.

Tightening of the nut is done by hand and when fully tightened the top and bottom ventilator plates form a secure association with each other and against the dome with the cover material firmly clasped between the ventilator plates.

One improvement of the design relates to making the first and second ventilator plates "universal" so that either type of plate may be used on either the "inside" or "outside". Another improvement embodied by the present invention is to provide each ventilator plate with an improved clamping surface to better secure the ventilator to the cover.

It should be noted that the present invention allows air to past freely through the ventilator plates via aligned openings (vent holes) provided in the plates thereby ventilating the system. One improvement embodied by the present invention relates to reconfiguring the ventilator plate design to better enable the venturi affect caused by air moving across the vent holes thereby provide improved air flow between the "inside" and "outside" of the cover.

Some of the general objects of the invention are now briefly described. Broadly speaking, a principle object of the present invention is to provide an improved ventilator apparatus comprising a seam channel configured for receiving a cover seam to provide an even clamping force when installing the ventilator apparatus directly over a cover seam.

Another principle object of the invention is to provide an improved ventilator apparatus configured with ventilator plates designed to provide aerodynamics features that better enable the venturi effect caused by wind moving across the apparatus' vent holes (by either natural wind or when the vehicle is in tow) thereby improving air flow between the "inside" and "outside" environment.

Another general object of the present invention is to provide an improved ventilator apparatus comprising ventilator plates with clamping features that provide a more secure association between the ventilator plates and the vehicle cover.

It is a further general object of the present invention is to provide an improved ventilator apparatus comprising universal ventilator plates that may be used on either the "inside" or "outside" of the vehicle cover while providing protection from water entering through the vent holes and providing an improved venturi effect.

For the adjustable support structure, broadly speaking, a principle object is to provide an improved flip lock support apparatus having an adjustable height where such support structure is light weight and configured to be adjusted and secured using one hand.

Another principle object of the invention is to provide a flip lock cover support apparatus having two pole sections in a telescoping configuration that can be secured at a desired height using one hand.

Yet another general object of the invention is to provide for an improved cover ventilator comprising a gear configured to interface with the gear teeth associated with a support structure where the gear is configured to be remotely activated using a crank.

Still another general object of the invention is to provide a support structure configured for being associated with a cover ventilator where the support structure comprises a crank system for remotely adjusting the height of the support structure.

Another general object of the invention is to provide a support structure comprising a pneumatic operated telescoping pole that allows the height of the support structure to be remotely adjusted using an air source.

Another general object of the invention is to provide a ventilator and/or support structure that is associated with an electronic module configured to perform a predefined set of electronically controlled functions.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
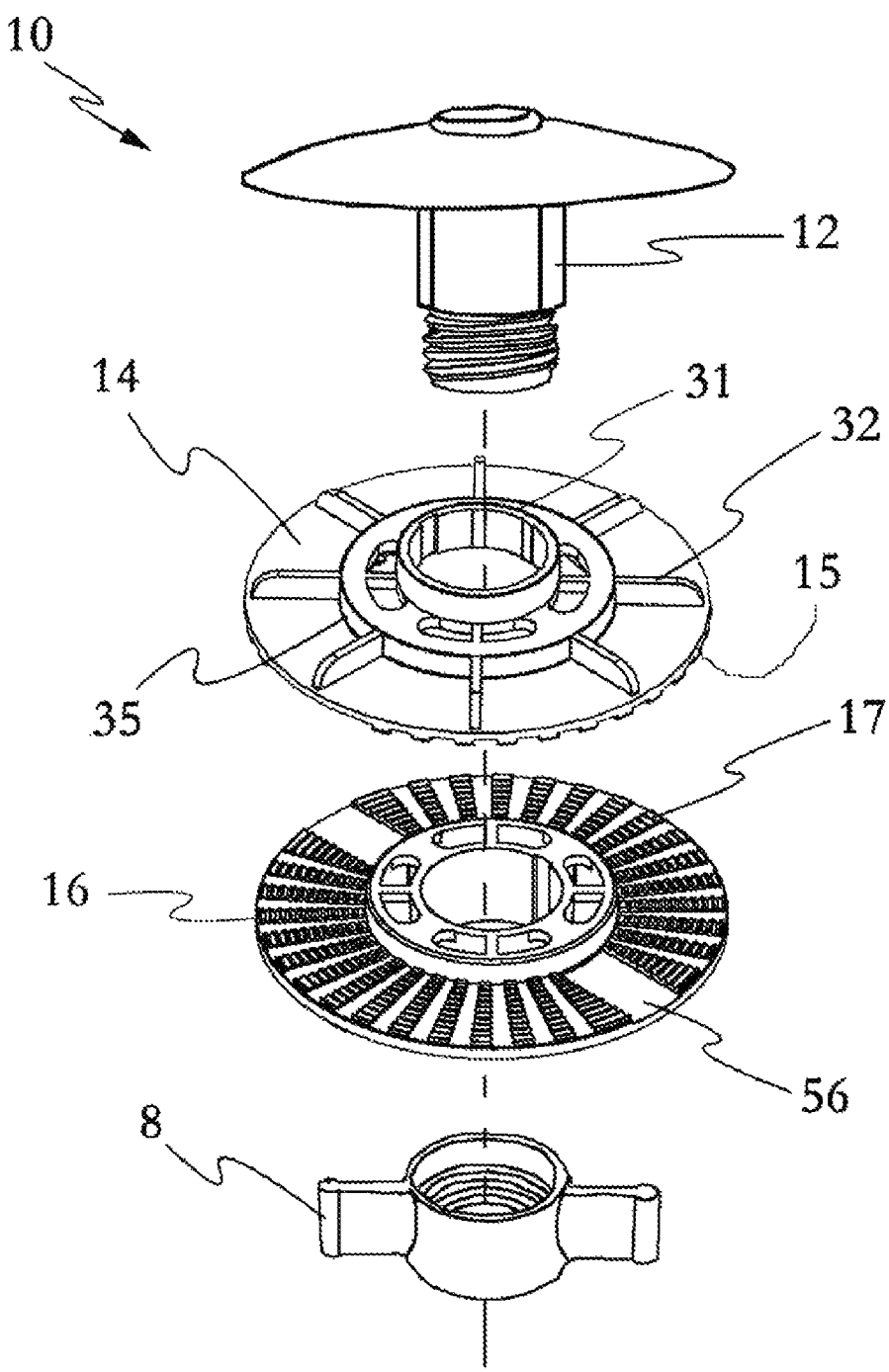
FIG. 1 is an exploded view of one exemplary embodiment of the invention showing a dome, a first ventilator plate and a second ventilator plate, and a nut.

Repeat use of reference characters throughout the present specification and appended drawings is intended to represent the same or analogous features or elements of the present technology. Various objects, advantages, and features of the invention will become apparent to those skilled in the art from the following discussion taken in conjunction with the drawings.

DESCRIPTION OF THE PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.) Similarly, two or more items are "electrically associated" by bringing them together or into relationship with each other in any number of ways including: (a) a direct, indirect or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

Referring now to FIG. 1, an exploded view of one exemplary embodiment of the invention is presented. The ventilator (10) comprises a dome (12), a first ventilator plate (14), a second ventilator plate (16), and a nut (8). For the illustrated embodiments depicted in the figures, ventilator (10) can be generally envisioned to include an outer portion and an inner portion. The outer portion is generally that portion of ventilator (10) that is located on the top or exterior side ("outside") of a cover (11) (see FIG. 2) and includes the top portion of the dome (12) and a first ventilator plate (14). The inner portion is generally that portion of ventilator (10) that is located on the under side or interior side ("inside") of the cover (11) (see FIG. 2) and includes part of the shaft portion of the dome (12), a second ventilator plate (16), and the securing nut (8). Thus, the dome (12) is common to the outer and inner portions of ventilator (10).

Figure 2:
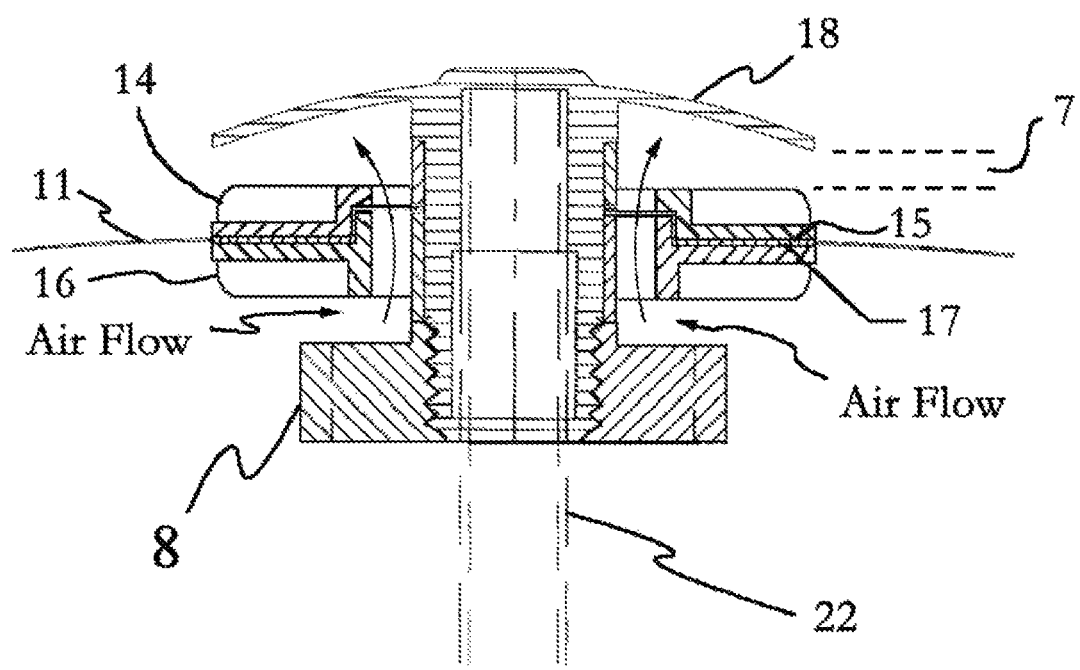
FIG. 2 is a front plan view, in cross section, of one embodiment of the present invention as it may appear in practice attached to a cover.

Referring now to FIG. 2, in the assembled view shown in FIG. 2, the cover material (11) is seen to include a hole there through with a main portion of the cover material (11) extending radially away from the hole and clamped between the opposed surfaces (15) and (17), of the first ventilator plate (14) and the second ventilator plate (16), respectively.

Figure 3:
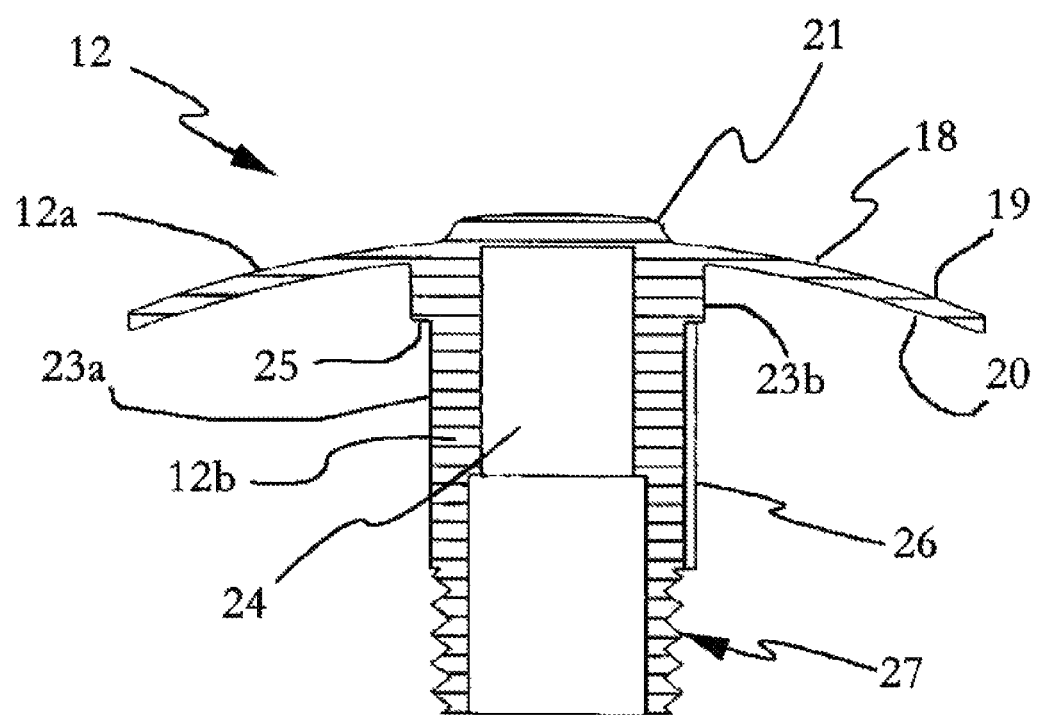
FIG. 3 is a front plan cross sectional view for one exemplary embodiment of the dome depicted in FIG. 1.

Referring now to FIG. 3, more details of dome (12) are considered. Dome (12) generally comprises a dome portion (12a) and a shaft portion (12b). Dome portion (12a) comprises a circular plate (18) having a curved umbrella like configuration such that the axial center is the uppermost portion and the outer surface curves in a downward direction as it extends away from the axial center. By way of further explanation, the upper surface (19) of circular plate (18) has a convex configuration while the under surface (20) has a concave configuration.

The dome portion (12a) serves in general to prevent rain and other elements from entering the cover through the air vents defined by the ventilator plates described later. One of ordinary skill in the art will appreciate that the domed configuration aids in such function by placing the outer edges of the dome on a plane substantially level, or slightly lower or higher than the air vents. Consequently, the outer diameter of circular plate (18) of dome portion (12a) is preferably, but not necessarily equal to the outer diameter of the ventilator plates (14) and (16). Accordingly, the shape of dome portion (12a) and its outer diameter is to be consistent with its intended function and is well within the knowledge of a person of ordinary skill in this art. In addition, embodiments where circular plate (18) is replaced by other configurations (such as polygonal configurations) fall within the scope of the present invention. A square dome, for example, would prevent the ventilator from rolling when being stored.

Dome (12) further includes a shaft portion (12b) that extends downwardly from the center of circular plate (18). For the presently preferred embodiment, dome portion (12a) and shaft portion (12b) actually comprise a single member, i.e. dome (12). Shaft portion (12b) includes a blind axial opening (24) suitably sized to receive a stand-off pole (22) (see FIG. 2). Blind axial opening (24) can be of a single diameter, tapered, or of stepped, multiple diameters to accept poles of different diameters. The opening is "blind" as it is closed at one end (i.e. the hole does not go all the way through).

The outer diameter of shaft portion (12b) includes a first-shaft-diameter (23a) and a larger second-shaft-diameter (23b) thereby defining a step or flanged surface (25) there between. In addition, one or more axial keys (26) extend along at least a portion the length of the smaller first-shaft-diameter (23a) of shaft portion (12b). Screw threads (27) are provided at the bottom of the smaller first-shaft-diameter (23a) configured for receiving nut (8). Both the threads and the axial keys may be integrally molded with shaft (12b). The function and characteristics of these features of shaft (12b) are further described below.

The slightly thicker center portion (21) of the circular plate (18) is provided to furnish extra strength to the dome in the event that a pole (22) (as shown in phantom in FIG. 2) is used to raise the cover (11) up and off of the covered vehicle or other device being protected by cover (11). Of course, the circular plate (18) can be made sufficiently thick so that the center portion (21) has the same thickness as circular plate (18) in general. As noted above, further alternative embodiments include plate members that can be of a variable thickness and that having other than a circular configuration.

Referring now to FIG. 4 through FIG. 9, features of a first ventilator plate (14) are considered. For the purposes of this discussion, the first ventilator plate (14) may be considered and described as a female ventilator plate. It should be appreciated, however, that embodiments where the first and second ventilator plates are substantially identical (not male or female) fall within the scope of the present invention. It should also be appreciated that in the following exemplary embodiment description, the first ventilator plate (14) is used on the "outside" or as the outer portion ventilator plate as described above; however, the novel improvements to the ventilator plates allow such plates to be interchangeable so that either ventilator plate (14) or ventilator plate (16) may be used as the outer portion ventilator plate or inter portion ventilator plate.

Referring to FIG. 4-9, first ventilator plate (14) comprises two opposed surfaces defining a circular plate. For the presently preferred embodiment, the first ventilator plate (14) has an outer diameter that is substantially the same as that of the dome (12). One ventilator plate surface is referred to as the gusset-surface and can be best seen in FIG. 4 and FIG. 8. The opposing surface to the gusset-surface is referred to as the gripping-surface and can be best seen in FIG. 5 and FIG. 9. For the presently preferred embodiment, first ventilator plate (14) comprises circular venting section (35) which further defines a plurality of vent holes (30) that extend through the entirety of the venting section (35). Any number of holes may be used, however, for the presently preferred embodiment four pairs of vent holes are used.

Figure 4:
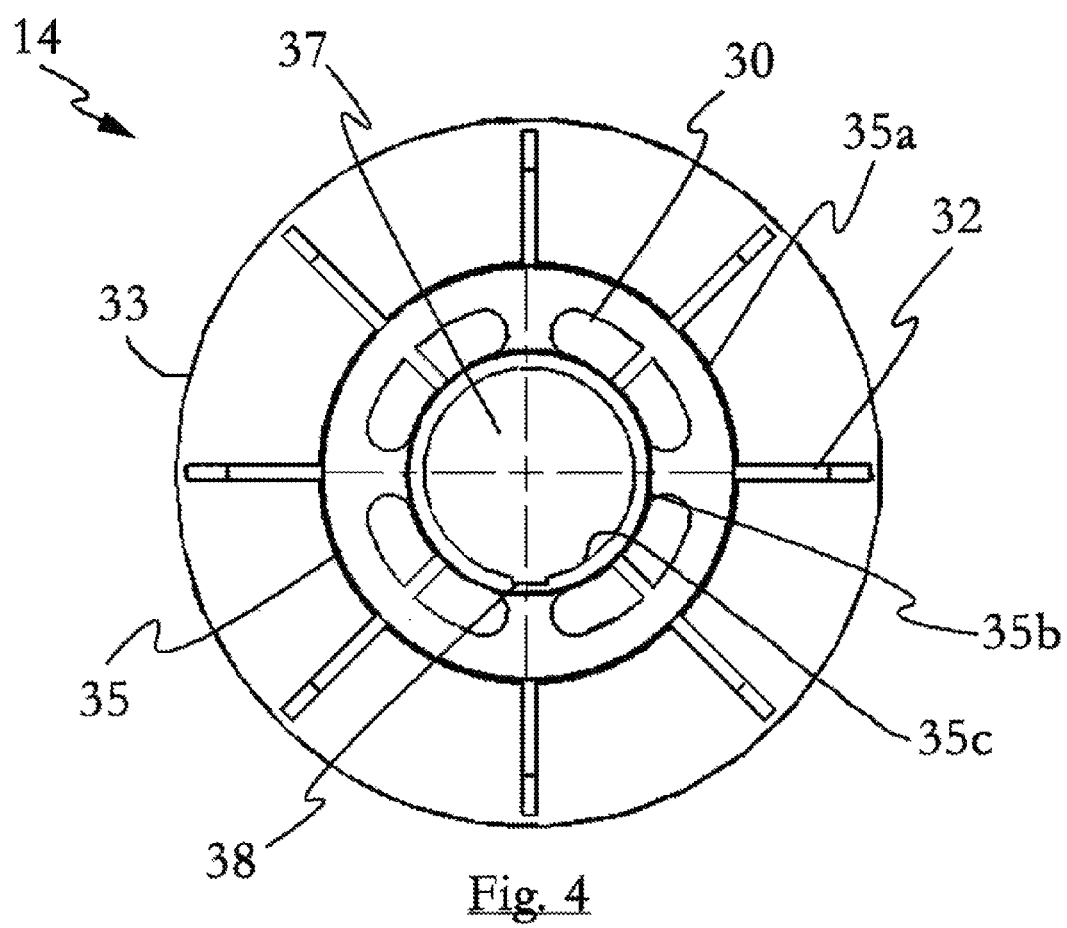
FIG. 4 is a top view of the gusset-surface of a female ventilator plate according to one possible embodiment of the invention.

As can be seen in FIG. 4, air vent section (35) has a generally circular outer diameter (35a) and a generally circular inter diameter (35b). Vent holes (30) are defined by section (35) disposed between the outer diameter (35a) and the inter diameter (35b). Adjacent to the air vent section is generally circular shaft receiver (31) (FIG. 8) having a generally circular outer diameter of about (35b) and a generally circular inter diameter of (35c). Shaft receiver (31) defines center opening (37) located at the center of first ventilator plate (14). Shaft receiver (31) is suitably sized to receive shaft portion (12b) so that the annular surface (or edge) of shaft receiver (31) associates with step (25) (FIG. 3) to provide a predefined gap (7) (FIG. 2) between circular plate (18) and first ventilator plate (14). One or more axial keyways (38) are provided along the inside wall of shaft receiver (31) where such axial keyways (38) are configured to receive one or more keys (26) (FIG. 3) in order to align the ventilator plate and prevent rotation of the ventilator plate relative to shaft portion (12b).

Preferably, but not necessarily, first ventilator plate (14) is glued or otherwise fixed to shaft portion (12b), but alternatively can be press fitted, fastened, or integrally formed with the shaft portion (12b) to maintain the first ventilator plate's relative position. As a further alternative, the dome (12) and first ventilator plate member (14) may be made as a single member.

Attention is now directed to the gusset-surface of first ventilator plate (14). As noted above, air vent section (35) defines a circular section that has a generally circular outer diameter (35a) and a generally circular inter diameter (35b). As best viewed in FIG. 1 and FIG. 8, air vent section (35) extends beyond the gusset-surface a predefined distance thereby defining vent height (45). Also depicted in FIG. 1 and FIG. 8, a plurality of gusset supports (32) extend radially outward from air vent section (35) and along the surface of first ventilator plate (14) toward the outer diameter of first ventilator plate (14). Such gusset supports (32) connect the surface of first ventilator plate (14) to the side of air vent section (35) thereby reinforcing the surface of first ventilator plate (14).

Figure 6:
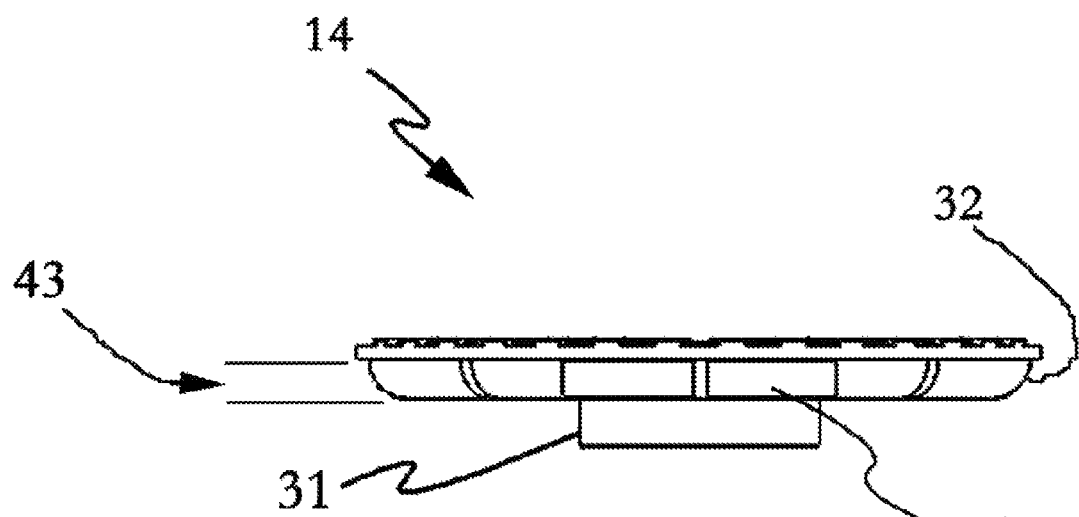
FIG. 6 is a side view of a female ventilator plate according to one possible embodiment of the invention showing a continuous gripping region.
Figure 7:
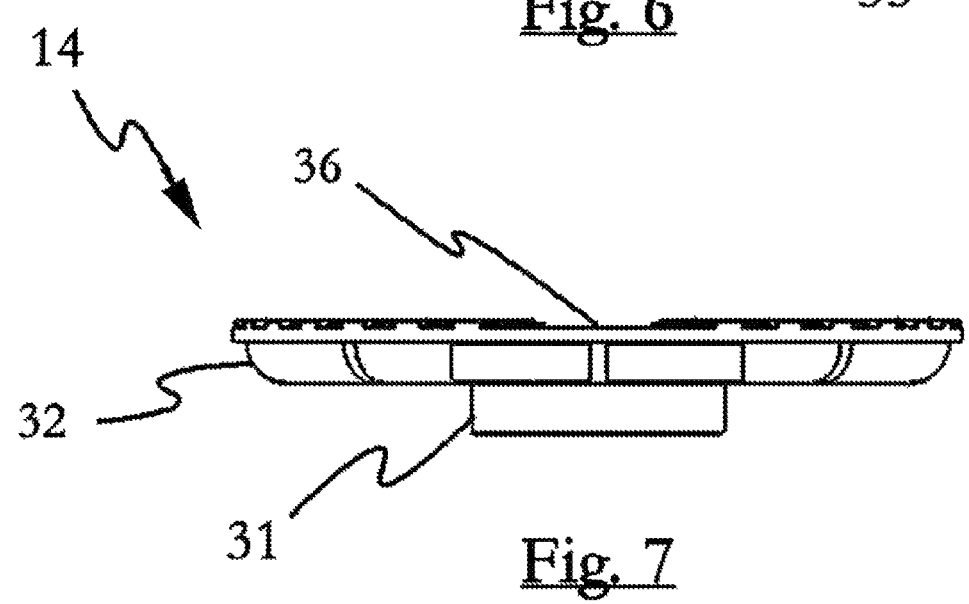
FIG. 7 is a side view of a female ventilator plate according to one possible embodiment of the invention showing two gripping regions separated by a seam channel.
Figure 8:
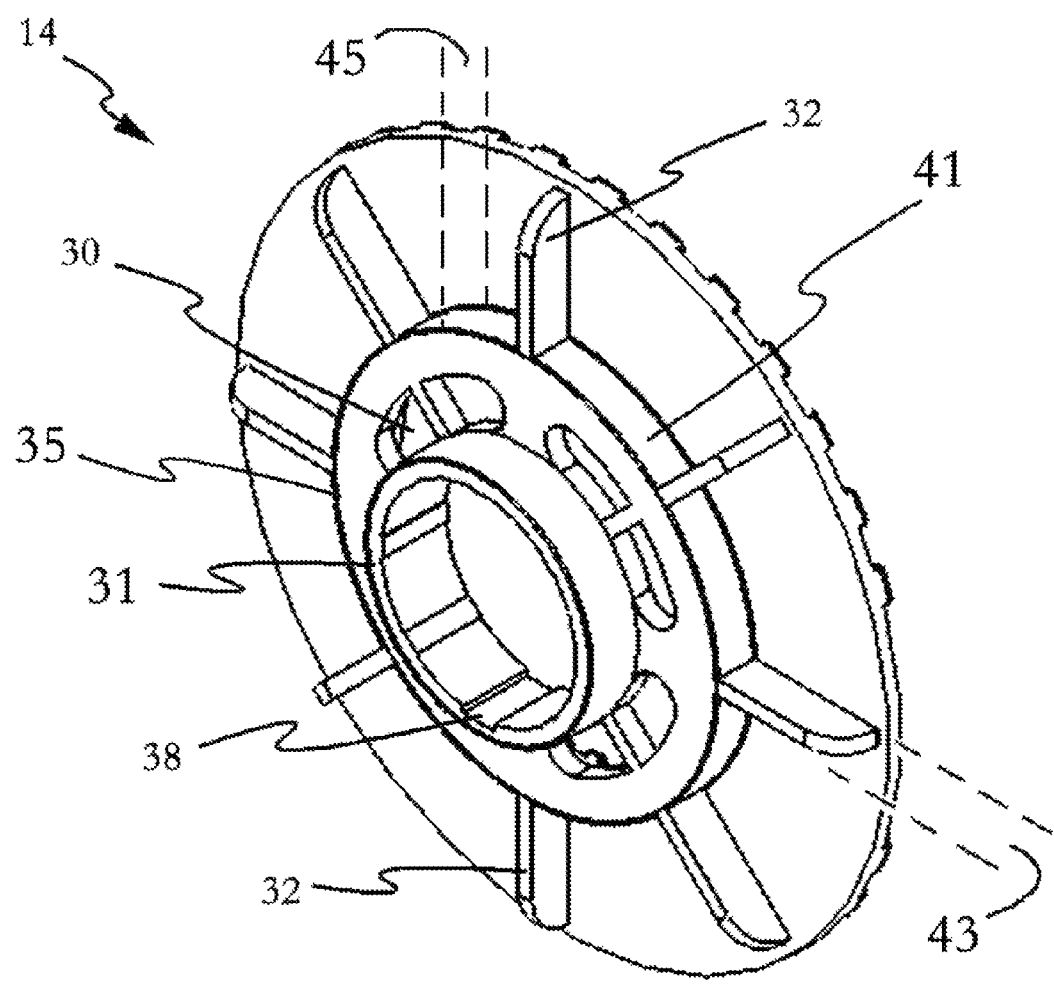
FIG. 8 is a perspective view of the gusset-surface depicted in FIG. 4.

In addition, gusset supports (32) extend perpendicularly from the gusset-surface a predefined gusset height (43) (FIG. 6, FIG. 8). For the presently preferred embodiment, gusset height (43) is substantially equal too or less than the vent height (45). It should be noted, however, that greater gusset heights (43) fall with the scope of the present invention.

One of ordinary skill in the art will appreciate that such a configuration improves air flow across vent holes (30) thereby providing an improved venturi feature. For such a configuration, when air flows across air vent section (35) (due to wind or the vehicle being in tow or other reasons), air flows along the concave under surface (20) creating a low pressure region above vent holes (30) thereby creating a suction effect which in turn improves air flow/exchange between the "inside" and "outside" of the cover.

Figure 5:
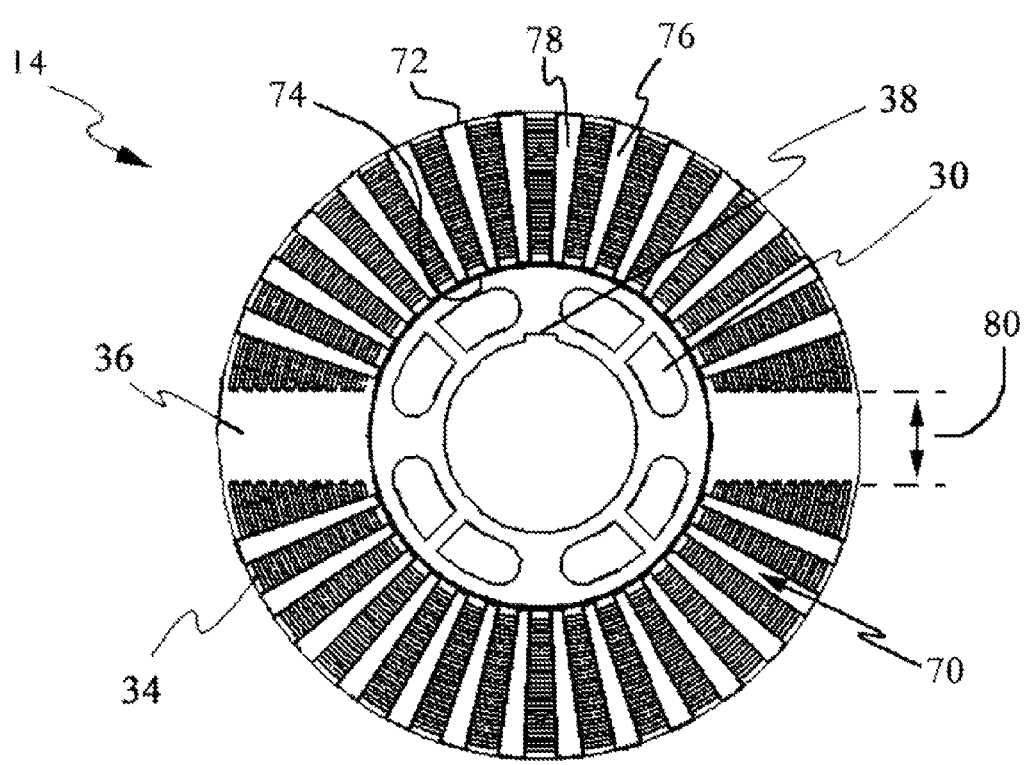
FIG. 5 is a top view of the griping-surface of a female ventilator plate according to one possible embodiment of the invention.
Figure 9:
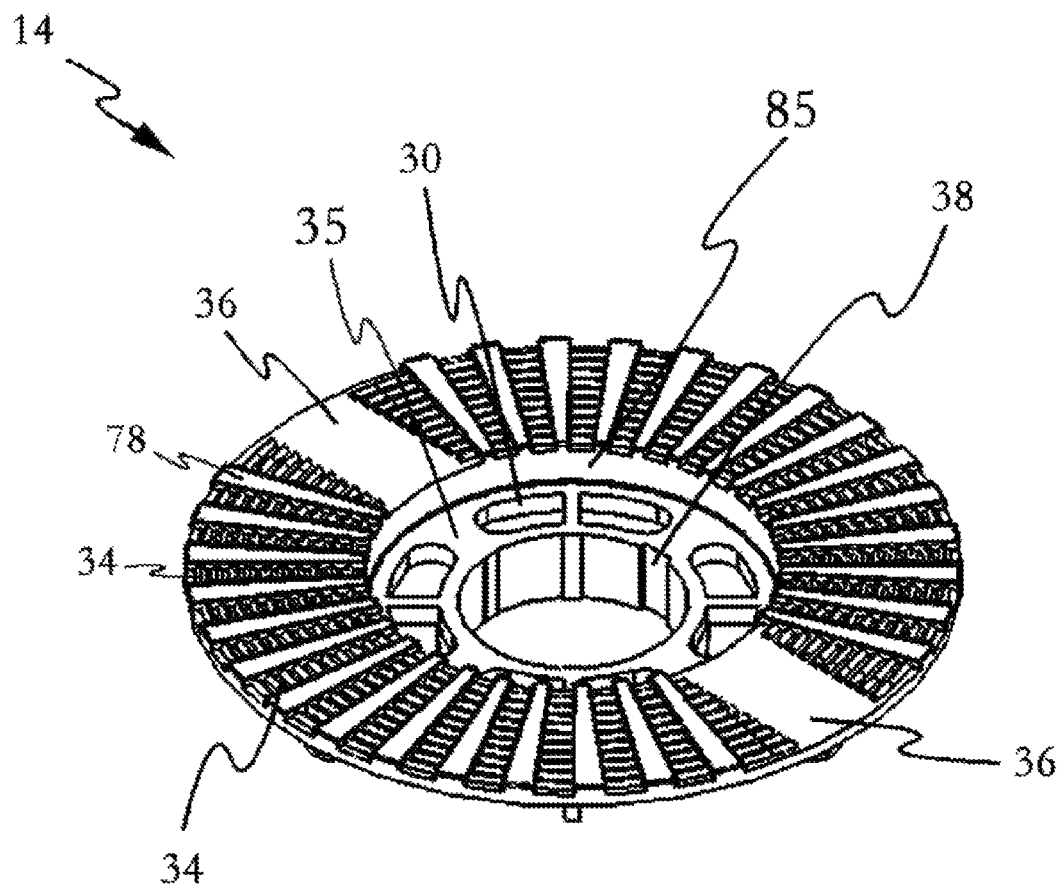
FIG. 9 is a perspective view of the gripping-surface depicted in FIG. 5.
Figure 10:
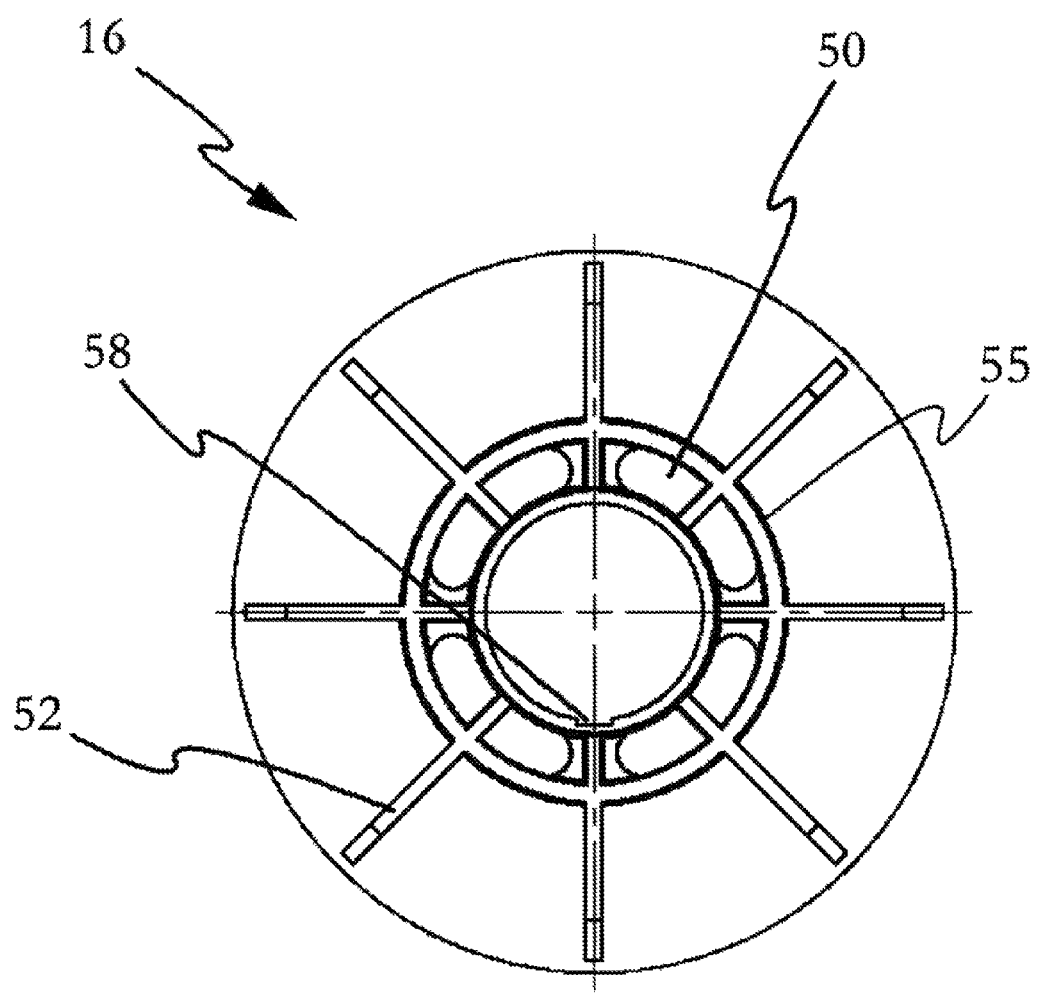
FIG. 10 is a top view of the gusset-surface of a male ventilator plate according to one possible embodiment of the invention.

As best seen in FIG. 5 and FIG. 9, the gripping surface of the first ventilator plate (14) is considered. The gripping surface of first ventilator plate (14) includes an annular gripping-region (70) having an outer-gripping-diameter (72) and an inter-gripping-diameter (74). A plurality of gripping-strips (34) extend along the gripping region (70) from about the inter-gripping-diameter (74) to about the outer-gripping-diameter (72). Each gripping-strip (34) defines a series of alternating ridges and grooves (corrugations) wherein such ridges extend perpendicularly from the gripping surface a predefined gripping-ridge-height. As shown in FIG. 5 and FIG. 9, each adjacent gripping-strip is separated by an alignment-tooth (78) with the exception of the griping-strips that are adjacent to a seam-channel (36) (described later). For the present embodiment of the invention, each alignment-tooth (78) extends perpendicularly from the gripping surface to a predefined alignment-tooth-height. Preferably, the alignment-tooth-height is greater than the gripping-ridge-height thereby forming a raised section between each gripping-strip (34). For the presently preferred embodiment, the gripping surface of the first ventilator plate (14) comprises thirty gripping-strips (34).

Referring now to FIG. 5, the gripping surface of first ventilator plate (14) further defines seam-channels (36) free from gripping-strips (34). Preferably, the seam-channels are disposed on opposing sides of gripping-region (70) as shown in FIG. 5 and FIG. 9 so that gripping-strips (34) are divided into two equal gripping sections. It should be appreciated, however, that any number of seam-channels may be use and their locations within the gripping region selected as desired for the application of interest. Seam-channels (36) have a predefined seam-channel-width (80) that is suitably sized to receive the seam of a cover that is to be used with ventilator (10). Such a configuration allows ventilator (10) to be installed directly over the seam of a cover while still providing a more even clamping force to the cover along gripping-region (70).

Referring now to FIG. 10 through FIG. 15, features of a second ventilator plate (16) are considered. For the purposes of this discussion, the second ventilator plate (16) may be considered and described as a male ventilator plate. It should be appreciated, however, that embodiments where the first and second ventilator plates are substantially identical (not male or female) fall within the scope of the present invention.

The second ventilator plate (16) comprises two opposed surfaces defining a circular plate. One such surface is referred to as the gusset-surface and can be best seen in FIG. 10 and FIG. 14. The opposing surface to the gusset-surface is referred to as the gripping-surface and can be best seen in FIG. 11 and FIG. 15. For the presently preferred embodiment, the second ventilator plate (16) has an outer diameter that is substantially the same as that of first ventilator plate (14).

Figure 15:
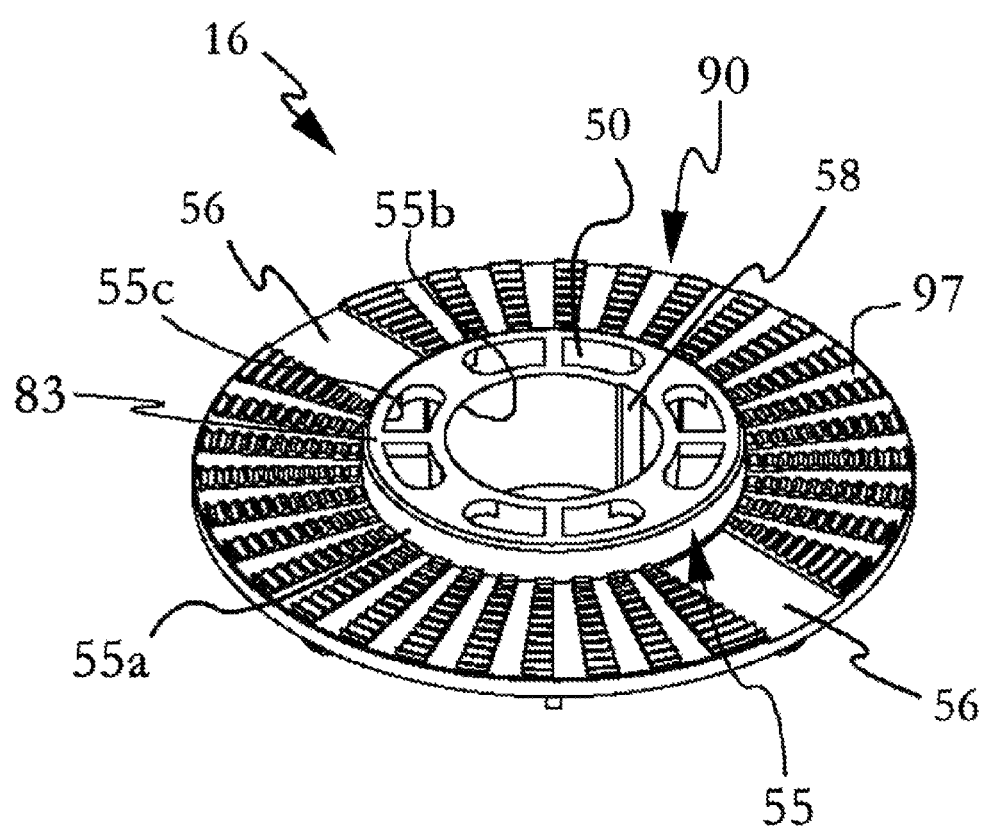
FIG. 15 is a perspective view of the gripping-surface depicted in FIG. 11.

Second ventilator plate (16) comprises circular venting section (55) which further defines a plurality of vent holes (50) that extend through the entirety of venting section (55). Any number of holes may be used, however, for the presently preferred embodiment four pairs of vent holes are used. As can be seen in FIG. 15, air vent section (55) has a generally circular outer diameter (55*a*) and a generally circular inter diameter (55*b*). Vent holes (50) are defined by air vent section (55) disposed between the outer diameter (55*a*) and the inter diameter (55*b*). Air vent section (55) further extends perpendicularly outward from the gripping-surface a predefined vent-section-height (80) (FIG. 12) forming a male-vent-section (83) (FIG. 15). The outer diameter (55*a*) distance is preferably slightly less than the circular outer diameter (35) for the first ventilator plate. Similarly, the vent-section-height (80) is preferably substantially equal to vent height (45) (FIG. 8) for the first ventilator plate. Such a configuration allows male-vent-section (83) to be received by the air-vent-receiver (85) (FIG. 9) defined by first ventilator plate (14).

Adjacent to the air vent section is generally circular shaft receiver (87) (FIG. 14) having a generally circular outer diameter of about (55*b*) and a generally circular inter diameter of (55*c*). Shaft receiver (87) defines center opening (84) located at the center of second ventilator plate (16). Shaft receiver (87) is suitably sized to receive shaft portion (12*b*) so that the annular surface (or edge) of shaft receiver (87) associates with step (25) (FIG. 3) to provide a predefined gap (7) (FIG. 2) between circular plate (18) and second ventilator plate (16) when the second ventilator plate is used in the alternate configuration (i.e. second ventilator plate (16) is used as the "outside" ventilator plate). One or more axial keyways (58) are provided along the inside wall of shaft receiver (87) where such axial keyways (58) are configured to receive one or more keys (26) (FIG. 3) in order to align the ventilator plate relative to the other pieces and prevent rotation of the ventilator plate about shaft portion (12*b*).

Figure 14:
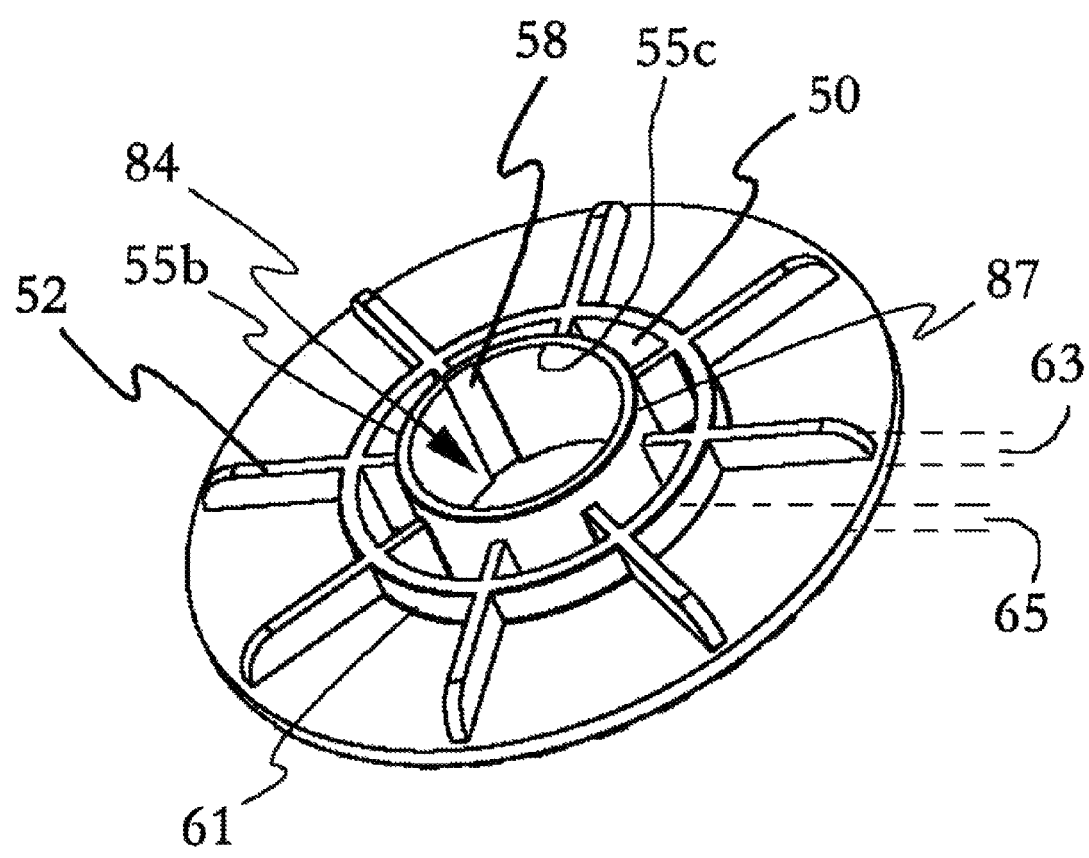
FIG. 14 is a perspective view of the gusset-surface depicted in FIG. 10.

Referring now to FIG. 14, attention is directed to the gusset-surface of second ventilator plate (16). As noted above, circular shaft receiver (87) has a generally circular outer diameter of about (55*b*) and a generally circular inter diameter of (55*c*). Adjacent to shaft receiver (87) is the air vent section defining air vents (50). Adjacent to air vents (50) is annular vent-wall (61) configured to prevent water and other materials from sliding across the gusset-surface and into vent-holes (50). A plurality of gusset supports (52) extend radially outward from shaft receiver (87), through the air vent-wall (61) and along the surface of second ventilator plate (16) toward the outer diameter of second ventilator plate (16). Such gusset supports (52) connect the surface of second ventilator plate (16) to the side of shaft receiver (87) and vent-wall (61) thereby reinforcing the surface of second ventilator plate (16).

Gusset supports (52) also extend perpendicularly from the gusset-surface a predefined gusset height (63). For the presently preferred embodiment, gusset height (63) is substantially equal too or less than the vent-wall-height (65). It should be noted, however, that greater gusset heights (63) fall within the scope of the present invention as long as air is allowed to freely flow across vent holes (50). As before, one of ordinary skill in the art will appreciated that such a configuration improves air flow across vent holes (50) thereby providing an improved venturi feature.

Figure 11:
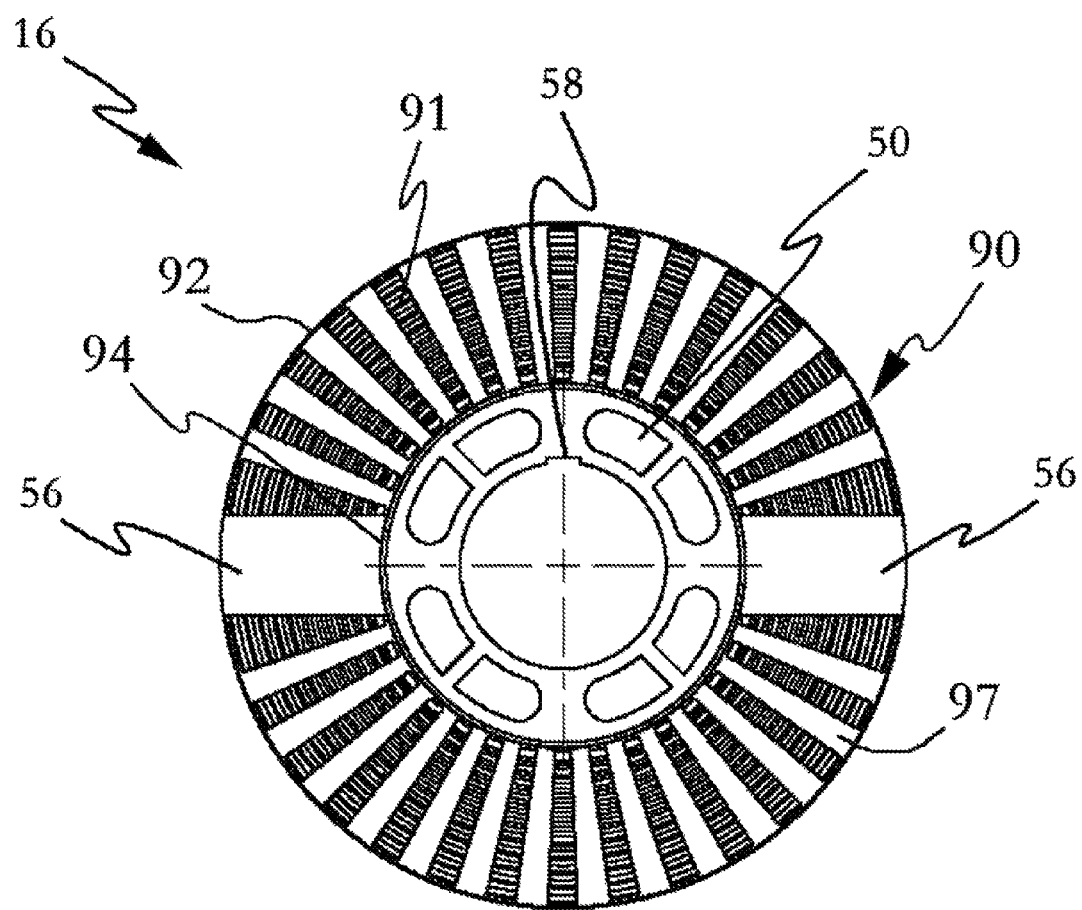
FIG. 11 is a top view of the griping-surface of a male ventilator plate according to one possible embodiment of the invention.
Figure 12:
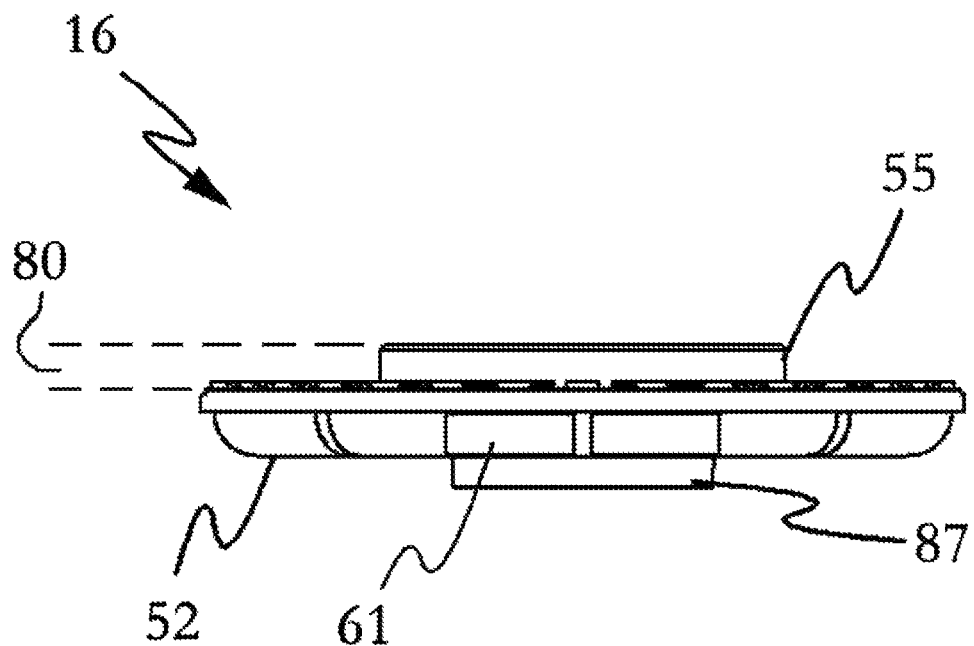
FIG. 12 is a side view of a male ventilator plate according to one possible embodiment of the invention showing a continuous gripping region.
Figure 13:
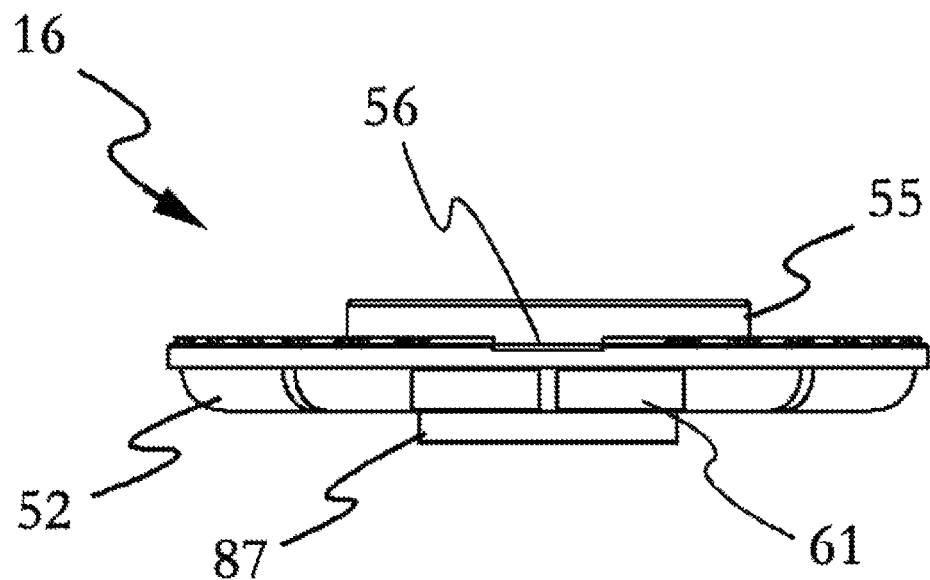
FIG. 13 is a side view of a male ventilator plate according to one possible embodiment of the invention showing two gripping regions separated by a seam channel.

As best seen in FIG. 11 and FIG. 15, the gripping surface of the second ventilator plate (16) is examined. The gripping surface of second ventilator plate (16) includes an annular gripping-region (90) having an outer-gripping-diameter (92) and an inter-gripping-diameter (94). A plurality of gripping-strips (91) extend along the gripping region (90) from about the inter-gripping-diameter (94) to about the outer-gripping-diameter (92). Each gripping-strip (91) defines a series of alternating ridges and grooves (corrugations) wherein such ridges extend perpendicularly from the gripping surface a predefined gripping-ridge-height. As shown in FIG. 11 and FIG. 15, each adjacent gripping-strip is separated by a non-gripping-strip section. Such non-gripping-strip sections form a channel defining alignment-teeth-receivers (97). For the presently preferred embodiment, the gripping-ridge-height for both ventilator plates is substantially equal so that the alignment-teeth (78) of first ventilator plate (14) are received by the alignment-teeth receivers (97) when ventilator (10) is assembled so that the gripping surface of both ventilator plates apply a more uniform and secure clamping force to cover (11). In addition, gripping-strips (91) are disposed at a point along the gripping-surface relative to axial keyway (58) that allows alignment-teeth (78) to align with the alignment-teeth-receivers (97) of first ventilator plate (14) when ventilator (10) is assembled.

Referring now to FIG. 15, the gripping surface of second ventilator plate (16) further defines seam-channels (56) free from gripping-strips (91). Preferably, the seam-channels are disposed on opposing sides of gripping-region (90) as shown in FIG. 11 and FIG. 15 so that gripping-strips (91) are divided into two equal gripping sections. It should be appreciated, however, that any number of seam-channels may be use and their locations within the gripping region selected as desired for the application of interest. Seam-channels (56) have a predefined seam-channel-width that is substantially equal to seam-channel-width (80) for the first ventilator plate (14). In addition, seam-channels (56) are disposed at a point along the gripping-surface at a point relative to axial keyway (58) that allows seam-channels (56) to align with seam-channels (36) when ventilator (10) is assembled.

As described above, when the second ventilator plate (16) is associated with shaft section (24) of the dome (12), the one or more keyways (58) orient second ventilator member (16) with first ventilator plate (14) such that the air vent holes (30) and air vent holes (50) are aligned providing a air flow path between the "inside" of the cover to the "outside".

Figure 16:
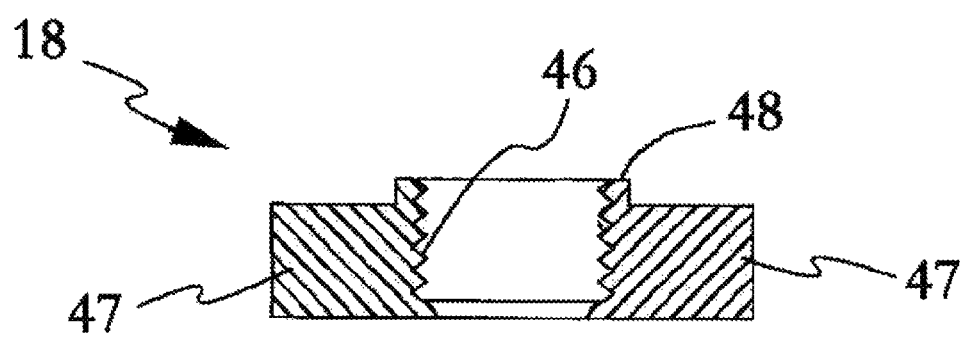
FIG. 16 is a plan cross sectional view of the nut of the embodiment shown in FIG. 1 taken along the line 1-1 of FIG. 17; and, FIG. 17 is a top plan view of the nut of FIG. 1 and FIG. 16.
Figure 17:
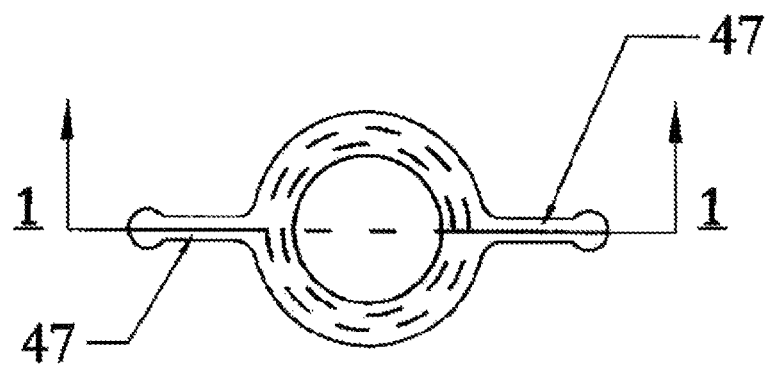

Referring now to FIG. 16 and FIG. 17, one exemplary fastening device is depicted. The fastening device is configured to secure and associate the second ventilator plate (16), the first ventilator plate (14), and dome (12) together. For the presently preferred embodiment, such fastening device is nut (8). Nut (8) comprises an internal screw thread (46) sized to mate with the external threads (27) at the bottom of shaft portion (12b) (FIG. 3). A number of alternative fastening devices can be used in place of the illustrated screw threads. For example, a pin in association with a camming slot, a lever operated cam lock, and other like attaching means as are known in the art. In the illustrated embodiment, a pair of oppositely disposed wings (47) extend from the outer diameter of the nut (8) to permit hand tightening. A hexagonal configuration can alternatively be used in lieu of wings (47). The clamping feature between the two ventilator plates and cover (11) is achieved by tightening nut (8) so that top annular surface (48) of the nut (8) bears against an annular surface defined by second ventilator plate (16) forcing the ventilator plates together.

Yet another alternative embodiment for the fastening device comprises a magnetic material disposed in a protective material. In that spirit, Nut (8) may be composed of magnetic material or comprise magnetic material disposed in a protective material to protect the item being covered from scratches. When the item being covered is a vehicle, fastening device comprises a magnetic plate disposed in a protective housing. The protective housing is preferably configured for being securely associated with nut (8). Alternatively, the protective housing comprises inter threads (46) for receiving external threads (27). The magnetic plate and protective housing is appropriated sized for the application of interest.

Support Structure—Flip Lock Pole

Referring back to FIG. 3, it was noted above that Dome (12) defines a shaft portion (12b) that extends downwardly from the center of the dome portion (12a). Shaft portion (12b) includes a blind axial opening (24) suitably sized to receive a support structure such as a pole. Blind axial opening (24) can be of a single diameter, tapered, or of stepped, multiple diameters to accept poles of different diameters.

Figure 18:
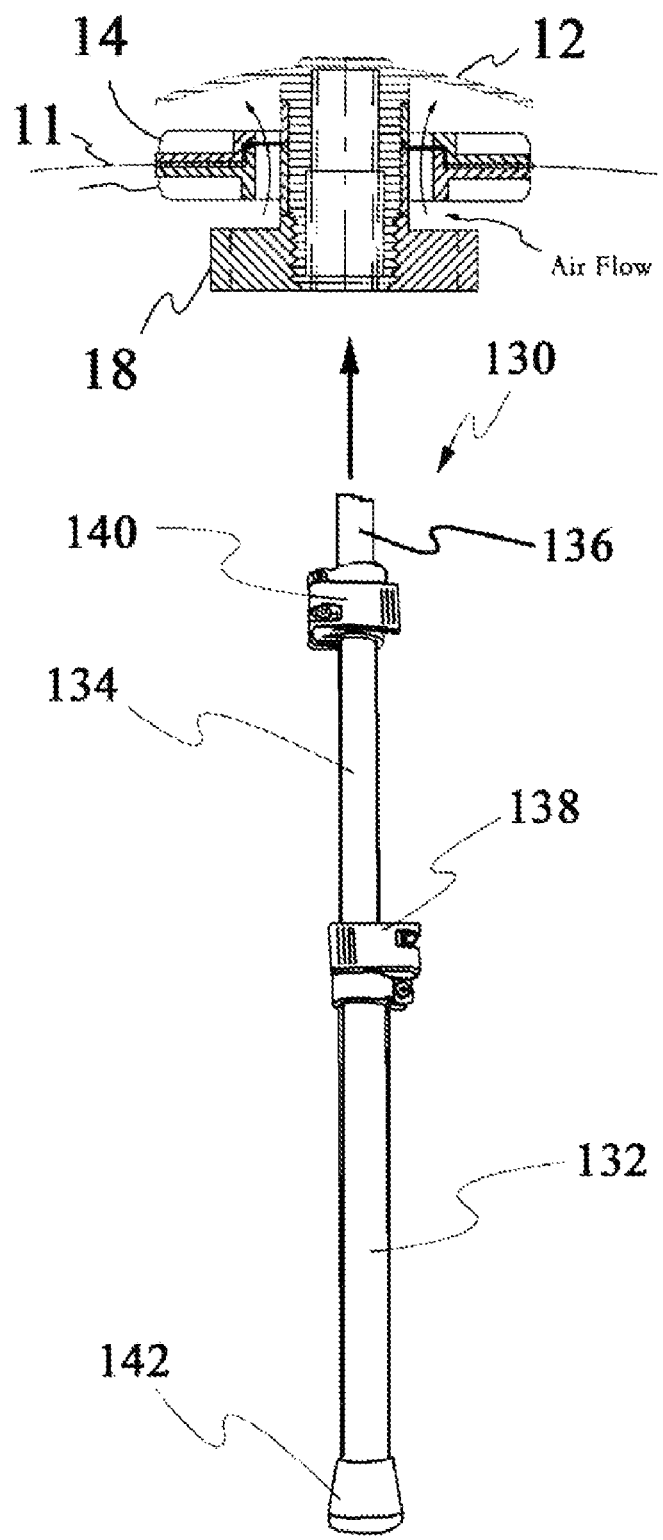
FIG. 18 is a side view of a ventilator associated with one embodiment of the invention comprising a three section telescoping pole secured in place by latching devices.

Referring now to FIG. 18, in the assembled view of the ventilator shown in FIG. 1 where a cover material (11) is seen to include a hole there through with a main portion of the cover material (11) extending radially away from the hole and clamped between the opposed surfaces (15) and (17), of the first ventilator plate (14) and the second ventilator plate (16), respectively. A support structure (130) is configured for being associated with the ventilator and for supporting the ventilator and cover at a desired height. For applications where support structure (130) is used with a cover ventilator as depicted in FIG. 1, and as shown in FIG. 3, the outer diameter of shaft portion (12b) includes a first-shaft-diameter (23a) and a larger second-shaft-diameter (23b) thereby defining a step or flanged surface (25) there between. Such shaft portion (12b) is thus configured for receiving one end of a support structure.

The presently preferred embodiment of the inventive flip lock support structure comprises a first hollow pole-section (132), a second hollow pole section (134), and a third pole section (136) (which may or may not be hollow) configured in a telescoping arrangement. Thus, the first pole section (132) has a slightly larger inside diameter than the outside diameter of second pole (134) which has a slightly larger inside diameter than the outside diameter of third pole section (136). Associated with one end of said first pole section (132) is a latching device (138) configured to selectively secure pole sections (132) and (134) in a desired position. The opposite end of first pole section (132) may be further associated with an end cap (142).

The end of second pole section (134) that is distal from latching device (138) is associated with latching device (140) configured to selectively secure pole sections (134) and (136) in a desired position. The free end of third pole section (136) is configured to be associated with a device such as a cover ventilator. It should be appreciated that the disclosed support structures can be used to support covers that do not have devices such as ventilators.

Preferably, support structure (130) is constructed to minimize weight so that it may be easily carried and adjusted using one hand. Thus, all pole sections preferably define a thin hollow pole made from a light weight material such as aluminum where the inner profile of such tubing is ribbed for added strength.

Figure 19:
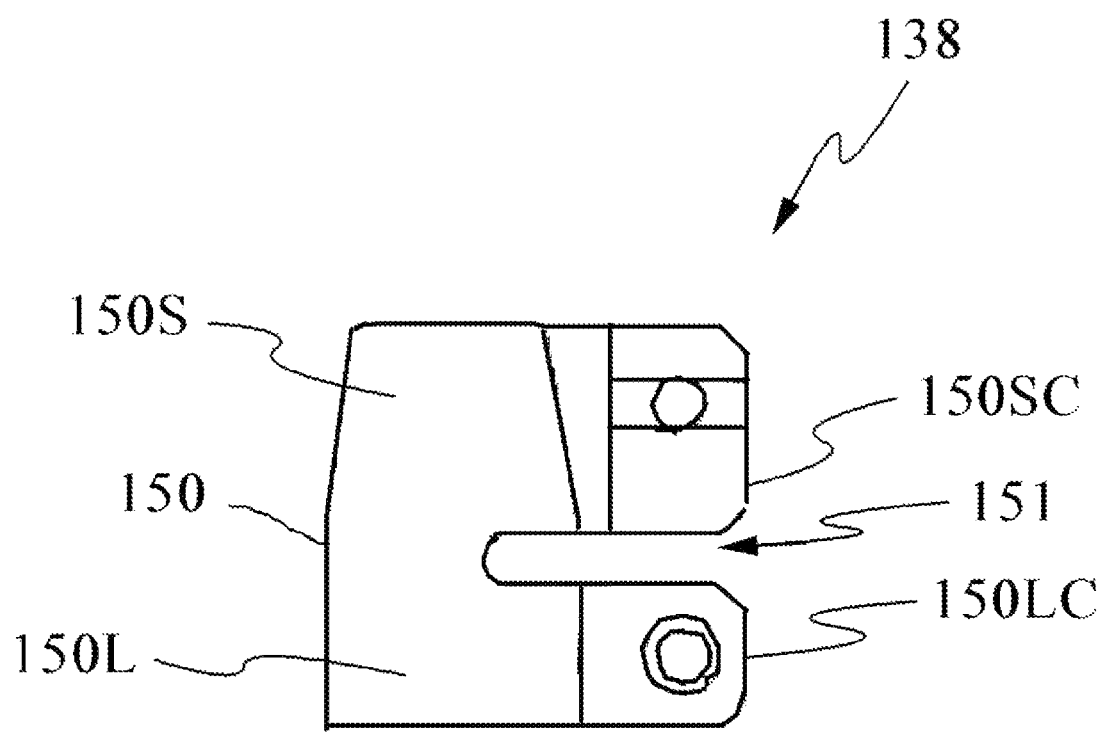
FIG. 19 is a side view of one embodiment of a latching device.
Figure 20:
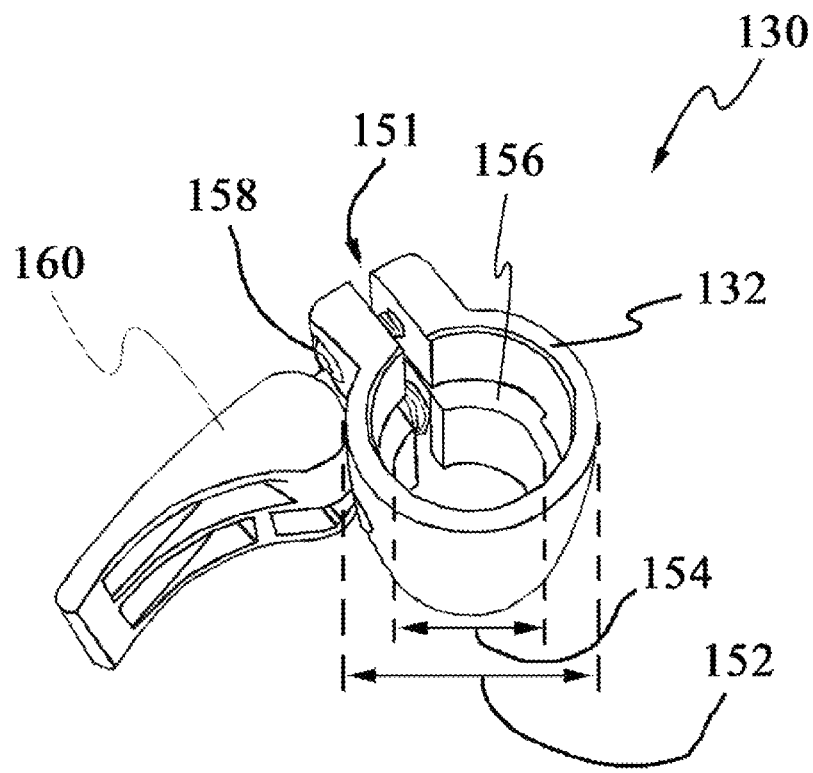
FIG. 20 is an elevated perspective of the latching device depicted in FIG. 19.

Referring now to FIG. 19 and FIG. 20, one embodiment of a latching device (138) is presented. Latching device (138) comprises a latch-body (150) defining a taper hollow body having a large section (150L) and a small section (150s) separated by slot (151). As shown in FIG. 20, the diameter (152) of large section (150L) is greater than the diameter (154) of small section (150S). The transition region between large section (150L) and small section (150S) defines pole-stop (156). Large section (150L) further comprises a clamp region (150LC) while small section (150S) comprises clamp region (150SC).

For this embodiment of the invention, diameter (152) is slightly larger than the outside diameter of pole section (132) so that one end of pole section (132) can be inserted into large section (150L) to pole-stop (156). Clamping bolt (158) is tightened until clamp region (150LC) securely associates large section (150L) to pole section (132).

Similarly, diameter (154) is slightly larger than the outside diameter of pole section (134) so that one end of pole section (134) can be inserted into small section (150S). As pole section (134) and latching device (138) are hollow, pole section (134) is free to slide in and out of pole section (132) as desired. When a desired position is reached, clamp lever (160) is moved to the locked position thereby compressing clamp region (150SC) to secure pole section (132) and pole section (134) in such desired position.

Figure 21:
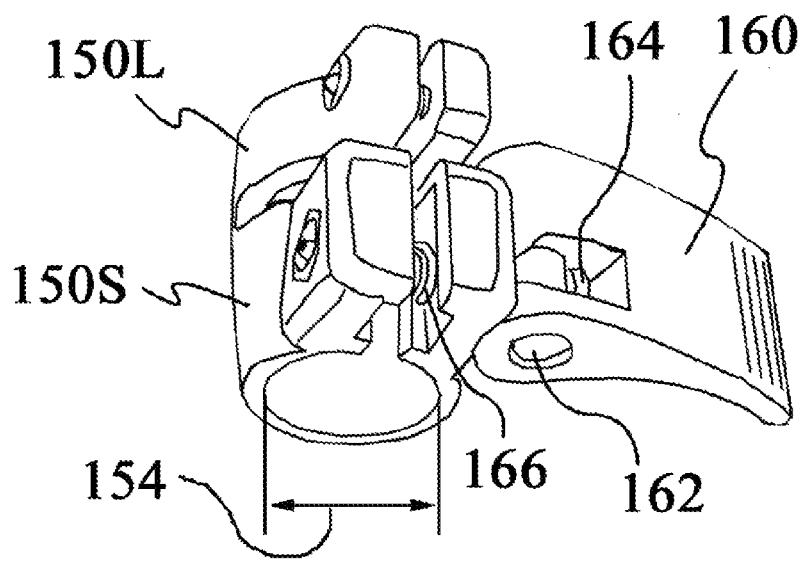
FIG. 21 is another perspective view of the latching device depicted in FIG. 19.
Figure 22:
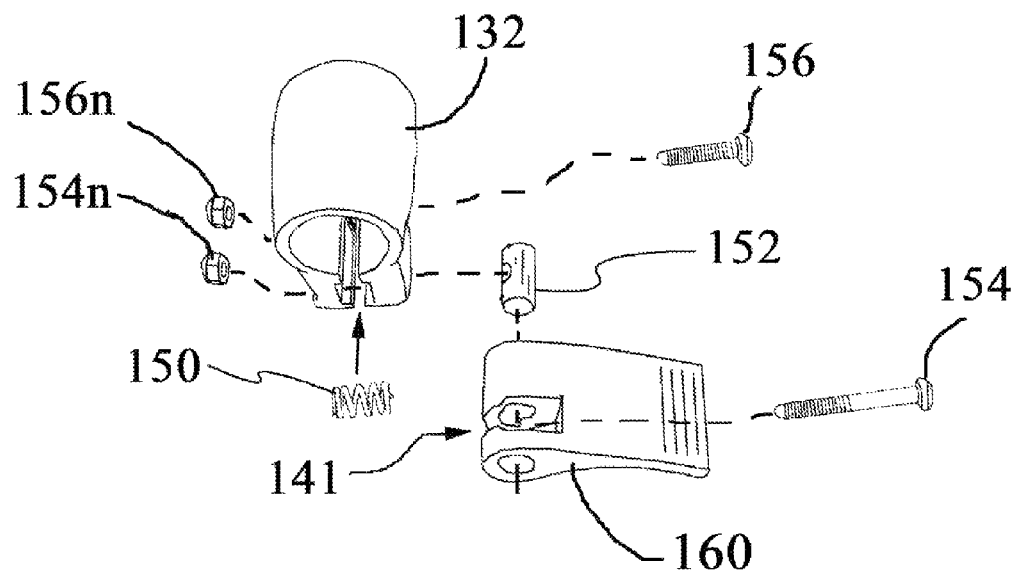
FIG. 22 is an exploded view of the latching device depicted in FIG. 21.
Figure 23:
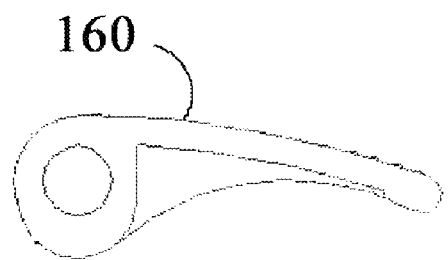
FIG. 23 is a top view of one latching device latch lever.

FIG. 21, FIG. 22, and FIG. 23 present additional views of latching device (138). One of ordinary skill in the art will appreciated that the description for latching device (140) is almost identical to the above description for latching device (138). One notable difference is the diameter measurements of the large section (150L) and the small section (150S). For latching device (140) the diameter of large section (150L) is about the same as the outside diameter of pole section (134) while the diameter of small section (150S) is about the same as the outside diameter of pole section (136).

Support Structure—Gear Driven Adjustment

Figure 24:
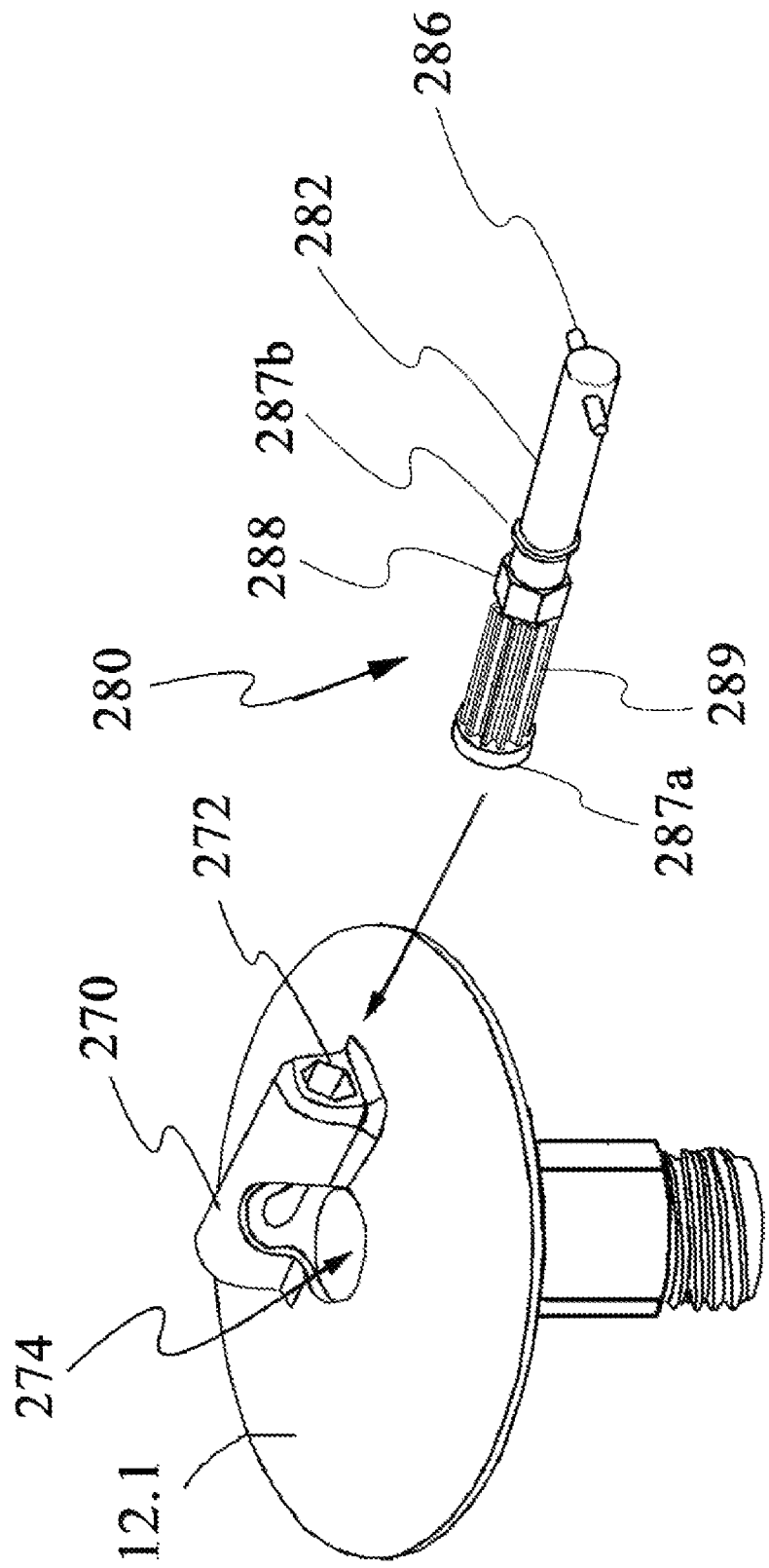
FIG. 24 is an elevated perspective view of one alternative embodiment of the invention comprising a modified ventilator configured for use with a modified gear driven support pole.
Figure 25:
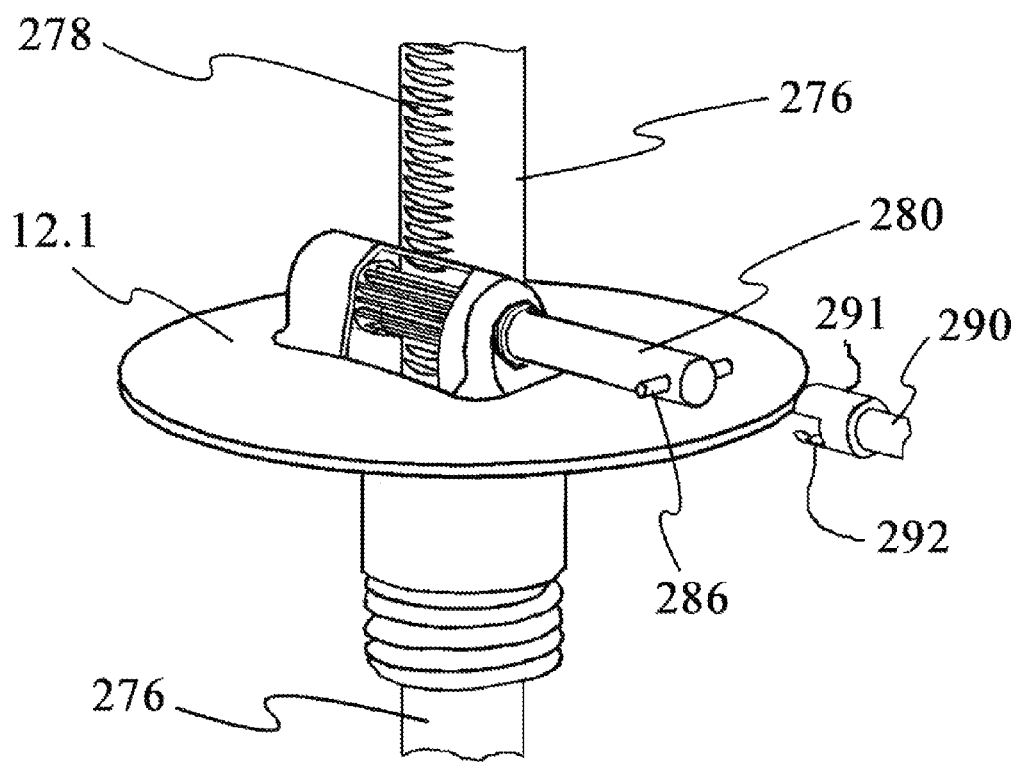
FIG. 25 is a side perspective view of FIG. 24.

Referring now to, FIG. 24 and FIG. 25 one alternative embodiment of the invention is presented. For this embodiment dome (12.1) of ventilator (10) is configured with a gear box (270) configured to receive a drive gear (280). A hole (274) is defined at the approximate center of dome (12.1) wherein such hole (274) is configured to receive support pole (276) so that ventilator (10) may move vertically along support pole (276). For this configuration, support post (276) may be a section (preferably the top section but not necessarily) of a telescoping support structure. Alternatively, pole (276) may be a ridged non adjustable support structure.

The drive gear (280) comprises a plurality of gear-teeth (289) configured to mesh with the pole-teeth (278) defined by support pole (276). The gear box (270) defines an inter void configured to receive drive gear (280) and to provide the gear-teeth (289) of drive gear (280) with access to pole-teeth (278). The entrance of the inter void of the gear box defines a hex (272) configured for associating with a corresponding gear-hex (288).

When drive gear (280) is pushed all the way into the gear box (270) void so that gear-hex (288) is disassociated from hex (272), the gear-teeth (289) of drive gear (280) are free to move. One of ordinary skill in the art will appreciate that when drive gear (280) is in such an unlocked position, rotating drive gear (280) in the clockwise direction will cause dome (12.1) to move vertically up support pole (276). Similarly, if drive gear (80) is rotated in the counter clockwise direction, dome (12.1) will move vertically down support pole (276).

By pulling drive gear (280) back out of the gear box (270) void until gear hex (288) is associated with hex (272), the drive gear (280) is placed in the locked position. For the preferred embodiment, when drive gear (280) is in the locked position, gear-teeth (289) are still associated with pole-teeth (278). One of ordinary skill in the art will appreciate that when drive gear (280) is in such a locked position, drive gear (280) may not be rotated and dome (12.1) is not free to move vertically along support pole (276). Such a configuration provides a self locking feature. It will be appreciated, however, that other configurations where the gear-teeth are disassociated from the pole-teeth in the lock position fall within the scope of the present invention.

To facilitate pushing in and pulling out drive gear (280) from the gear box (270) void and the remote rotation of drive gear (280), a crank (290) is used. Crank (290) comprises a drive gear shaft socket (291) configured with an L-slot (292). To push drive gear (280) into the gear box (270) void, the shaft socket (291) is simply associated with the end of drive gear shaft (280) so that drive gear shaft pins (286) are received by shaft socket (291) and a pushing force is applied. To pull drive gear (280) out of the gear box (270) void so that gear hex (288) is associated with hex (272) (locking position), the shaft socket (291) is associated with the end of drive gear shaft (281) so that drive gear shaft pins (286) are received by shaft socket (291) and secured by the L-slot (292) and a pulling force is applied. It will be appreciated that "pulling out" the drive gear (280) does not necessarily mean pulling the drive gear all the way out of the gear box (270) void. In fact, as noted above, for the preferred embodiment, the drive gear is only pulled out far enough to allow the gear-hex (288) to associate with the void hex (272) thereby locking the drive gear (280) (and ventilator 10) at a desired position.

To cause the drive gear to rotate, crank (290) is turned in either the clockwise or counter clockwise direction as desired. It should be appreciated that the length of crank (290) may be any suitable length to allow a user to remotely raise and lower ventilator (10).

Support Structure—Pneumatic

Figure 26:
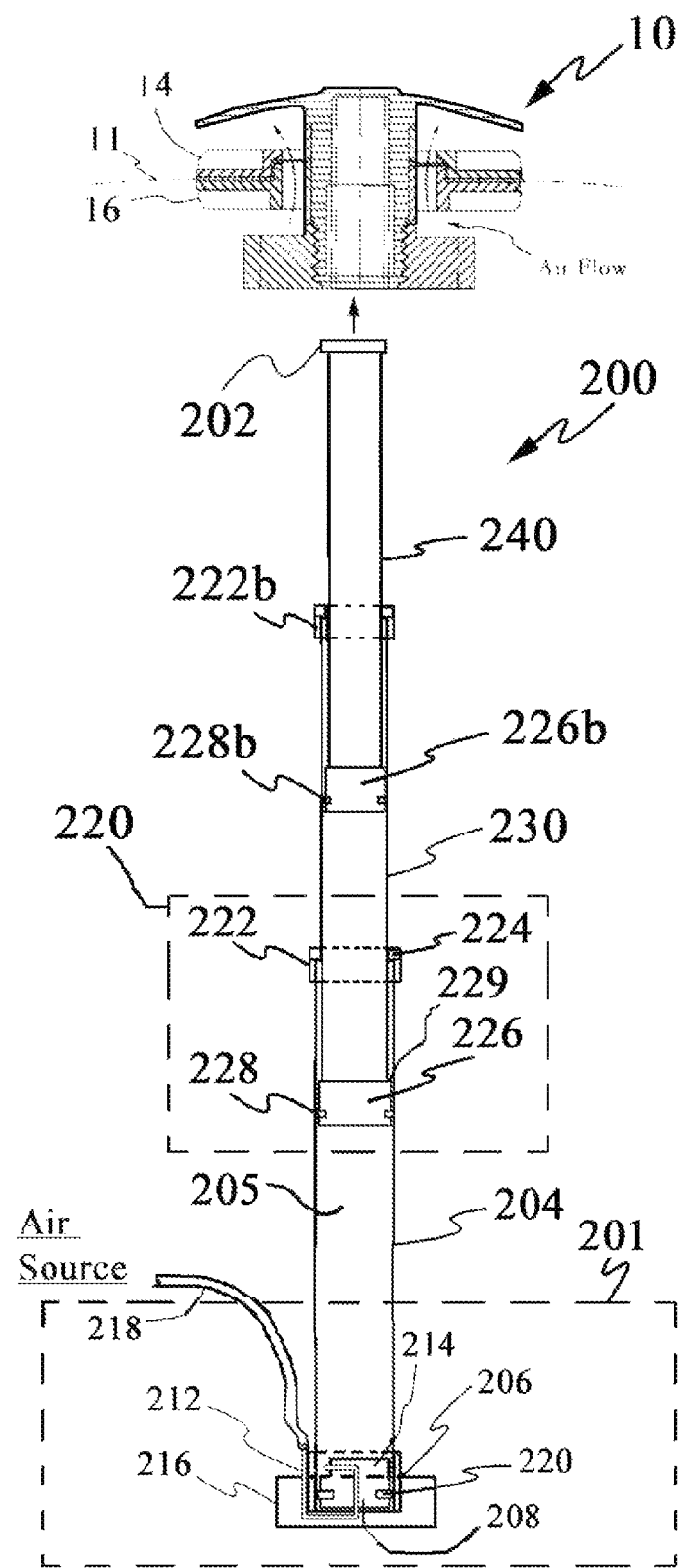
FIG. 26 is a side view of a ventilator associated with another alternative embodiment of the invention comprising a pneumatically controlled telescoping support pole.
Figure 27:
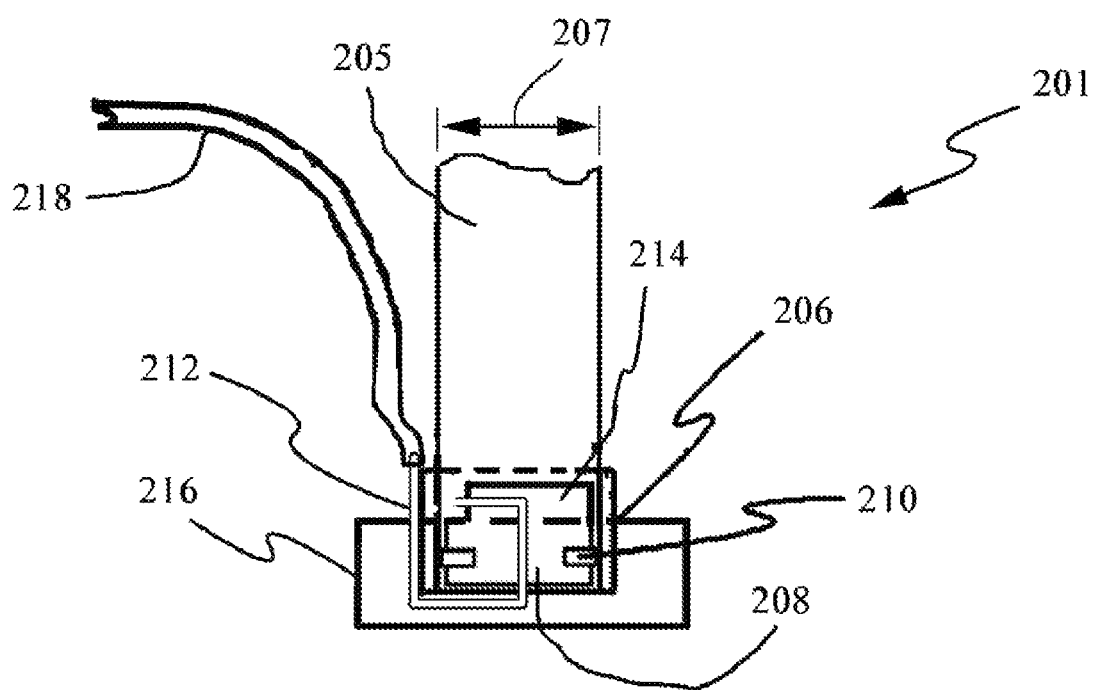
FIG. 27 is a close up view of a section of the device depicted in FIG. 26.

Referring now to FIG. 26 and FIG. 27, another alternative embodiment of the invention is presented. For this embodiment a pneumatically operated support structure (200) is used to raise and lower a device such as a cover, perhaps associated with a cover ventilator. As shown in FIG. 26, support structure (200) is a Pneumatically Operated Telescoping Pole (POTP). POTP (200) comprises a plurality of telescoping sections (POTP section 204, POTP section 230, and POTP section 240), with the last section associated with pneumatic end cap (202). For such embodiment, pneumatic end cap (202) forms at least a substantially air tight seal at the end of the last section and is suitably configured for being associated with ventilator (10). A substantially air tight seal is defined as a seal that, while not completely air tight over time, holds enough air to maintain the pressure required to provide the "support function" for a predetermined length of time for an anticipated load without the need for re-pressurizing the system. Embodiments where end cap 202 is integral to POTP section 240 fall within the scope of the invention.

For the presently preferred embodiment, the telescoping sections are in the shape of a round pole or pipe. Such sections may be constructed from any suitable material including PVC, plastic, and aluminum. As best viewed in FIG. 27, the first POTP section (204) comprises a hollow tube having diameter (207) and defining a substantially air tight chamber (205). A first end of first POTP section (204) is associated with a Pneumatic end cap (206). Pneumatic end cap (206) comprises a plug (208) with a diameter slightly less than the diameter (207). Plug (208) comprises a grove running around its circumference where such grove is configured for receiving 0-ring (210). Such a configuration forms a substantially air tight seal between the first end of first POTP section (204) and pneumatic end cap (206). It should be appreciated that pneumatic end cap (206) may be associated with first POTP section (204) in any number of ways such as threads or glue.

Pneumatic end cap (206) further comprises access-port (212) configured to provide external access to substantially air tight chamber (205). Plug (208) further defines a section-stop (214) configured to stop an internal telescoping section before it reaches access-port (212). Associated with the pneumatic end cap (206) and the first end of first POTP section (204) is protective-cap (216). Protective-cap (216) is preferably constructed of rubber or some other material designed to protect the POTP and the item that POTP presses against.

Access-port (212) is further configured for being associated with a air source such as air supply hose (218). By pumping air into access-port (212) the telescoping pole sections are pressurized causing them to move to an extended position. By removing air from the telescoping pole sections via access-port (212), such sections may be compressed in a retracted position. It should be appreciated that other access ports may be provided for removing and/or supplying air to the system.

Figure 28:
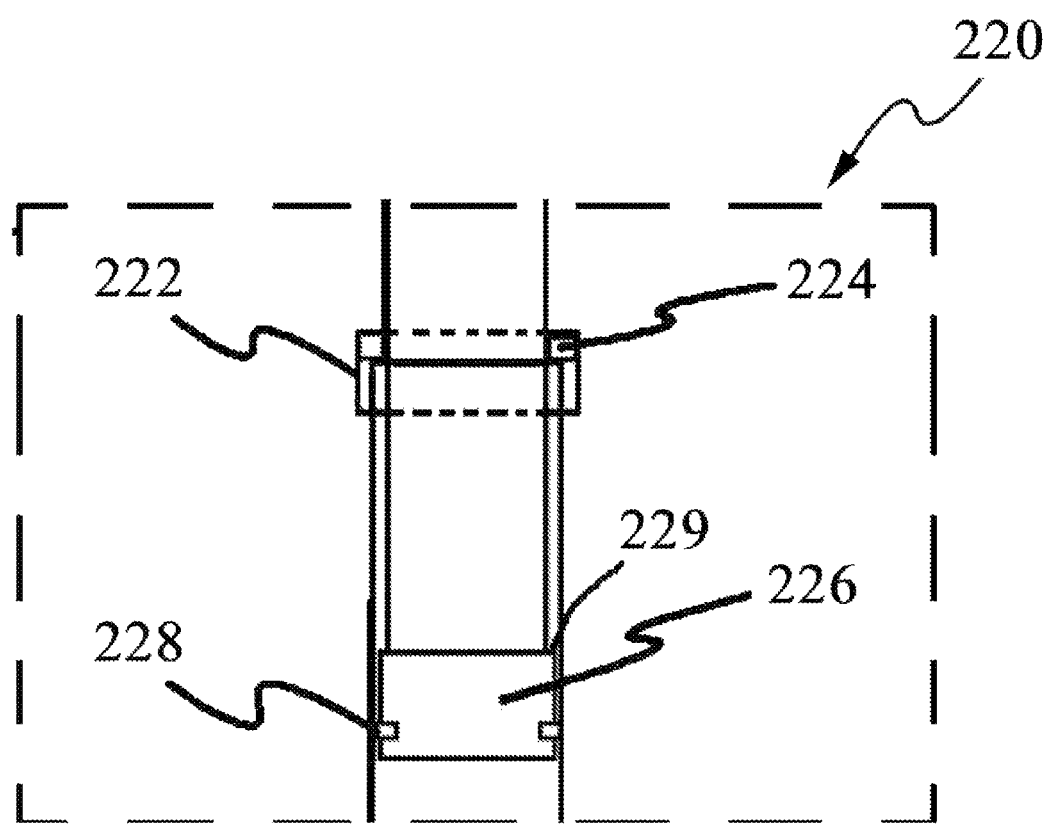
FIG. 28 is a close up view of another section of the device depicted in FIG. 26.
Figure 29:
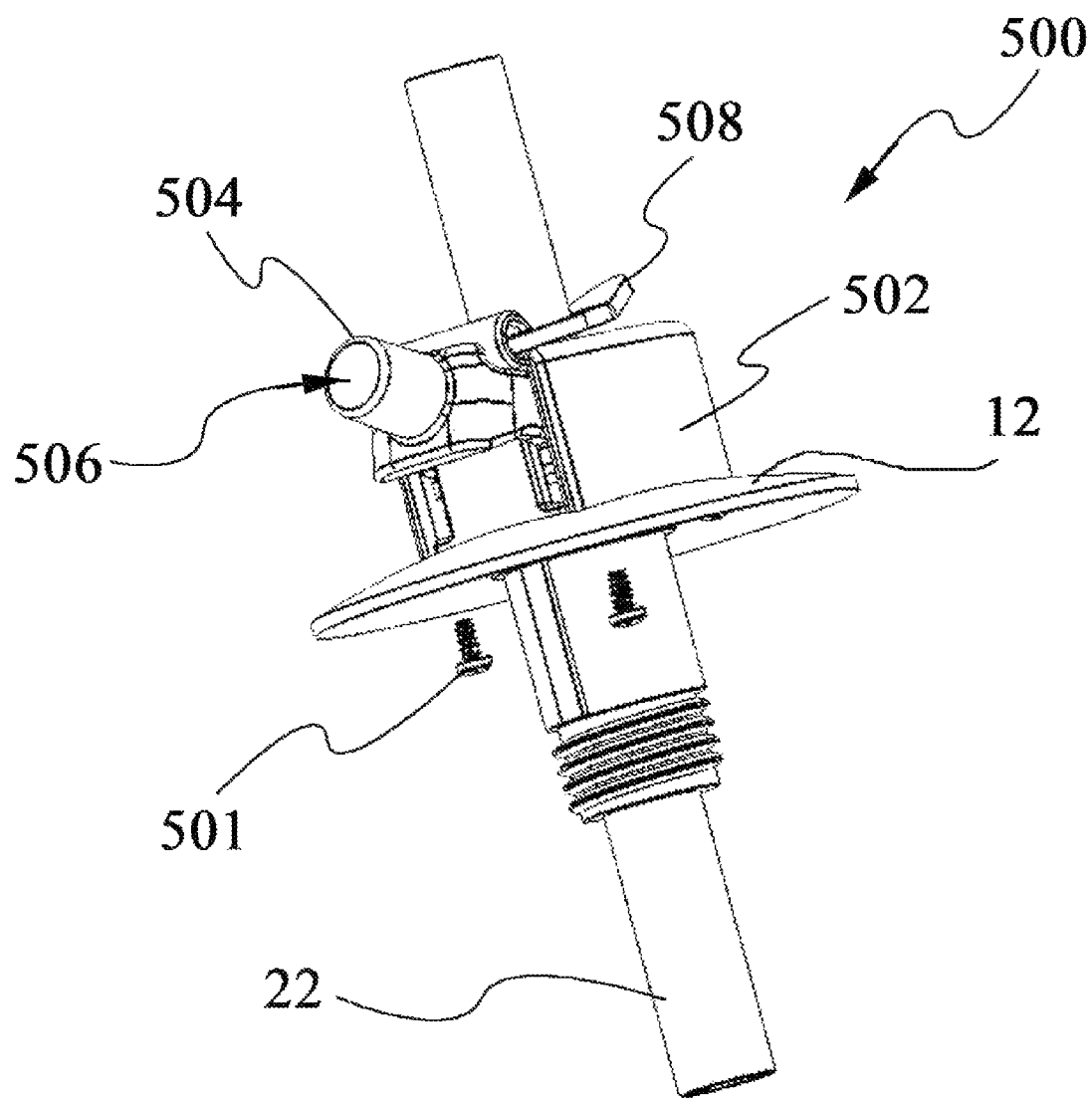
FIG. 29 is a side perspective view of modified ventilator dome configured with a jacking system for adjusting position of the ventilator relative to the support structure.
Figure 30:
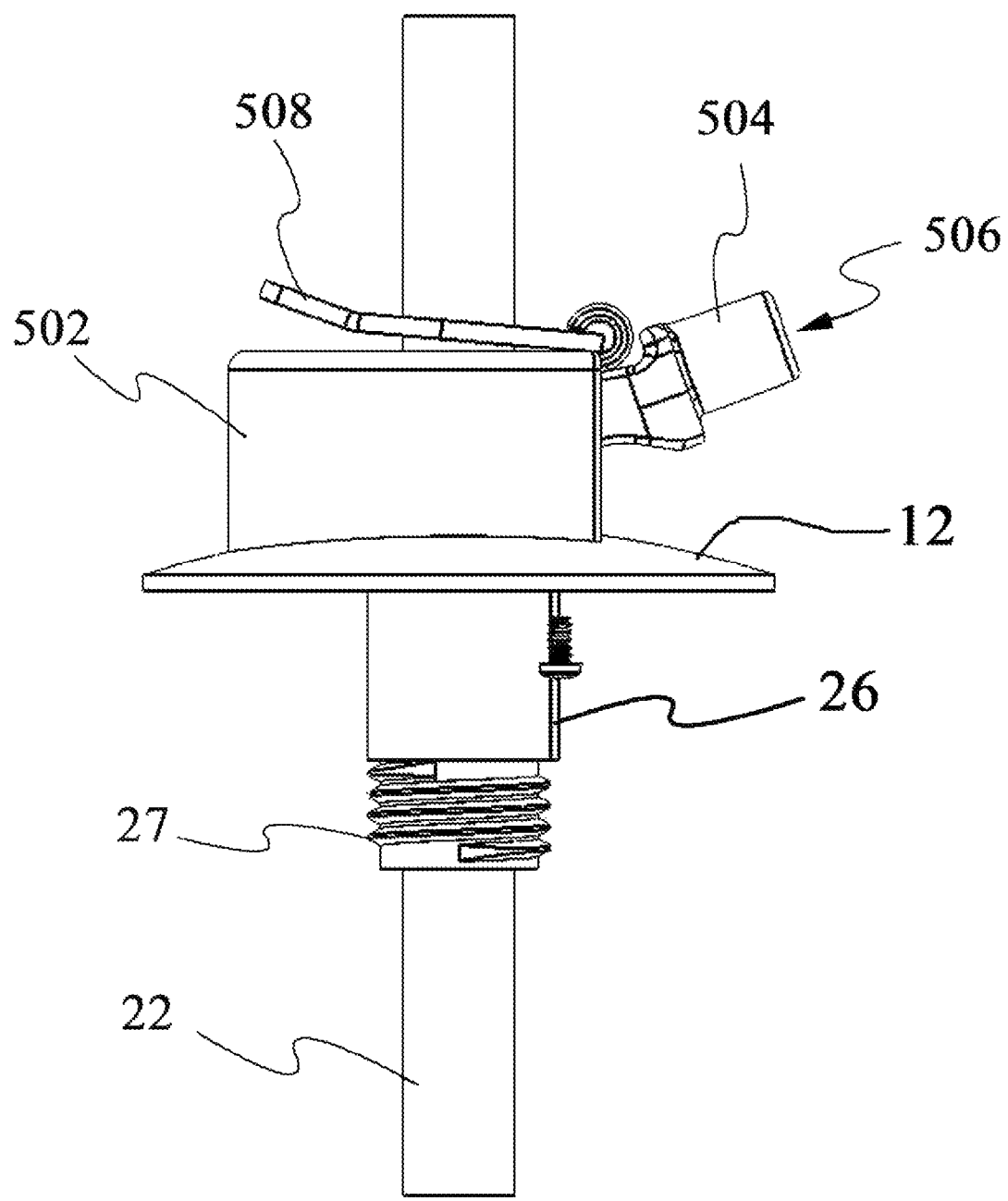
FIG. 30 is a side view of the device depicted in FIG. 29.
Figure 31:
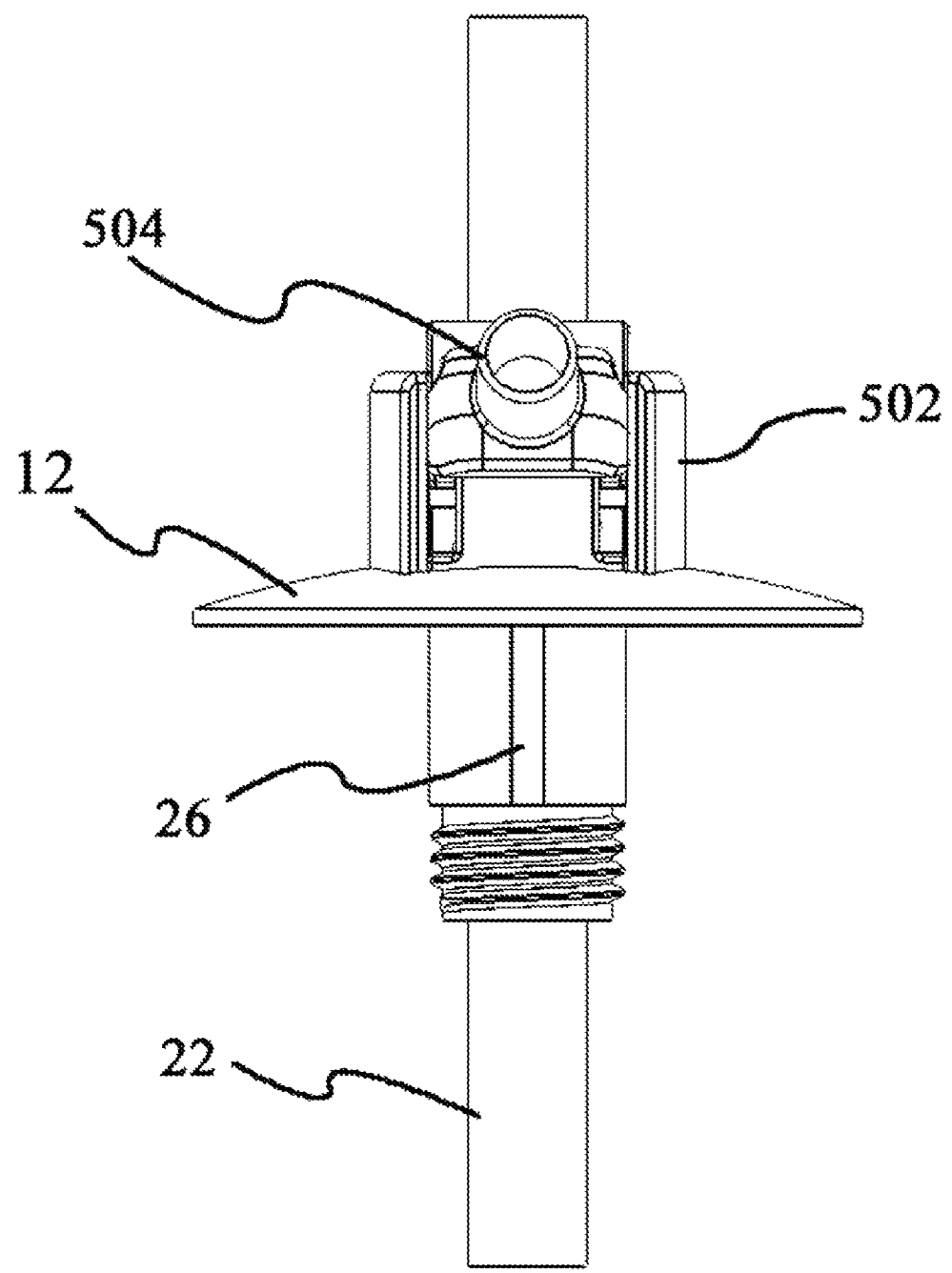
FIG. 31 is a front view of the device depicted in FIG. 29.
Figure 32:
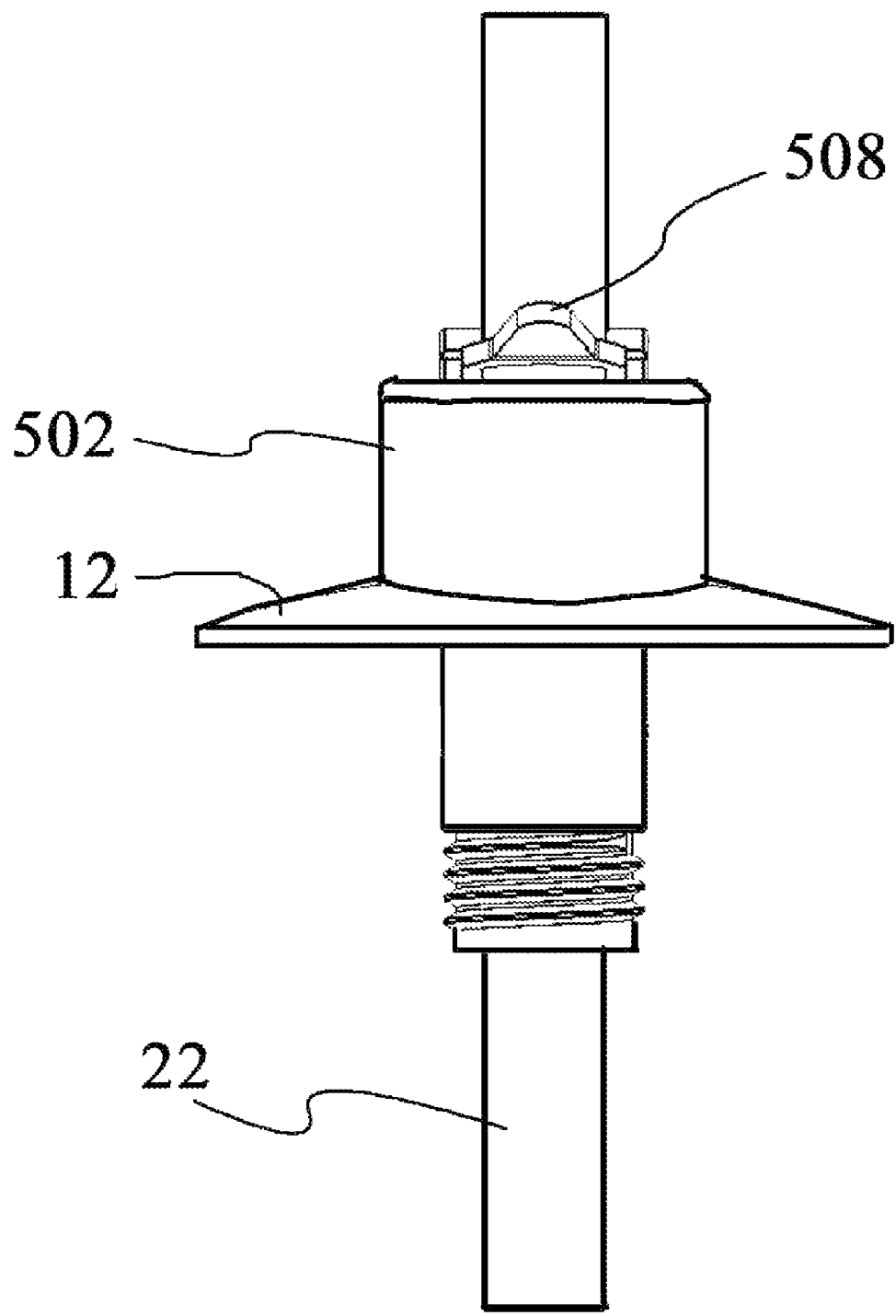
FIG. 32 is a back view of the device depicted in FIG. 29.
Figure 33:
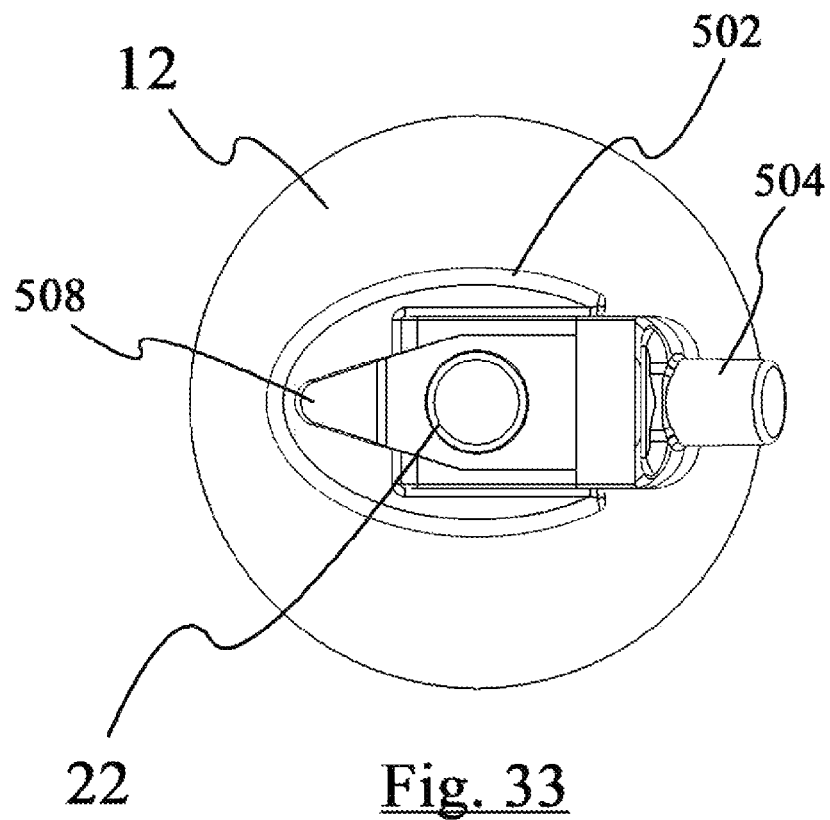
FIG. 33 is a top view of the device depicted in FIG. 29.
Figure 34:
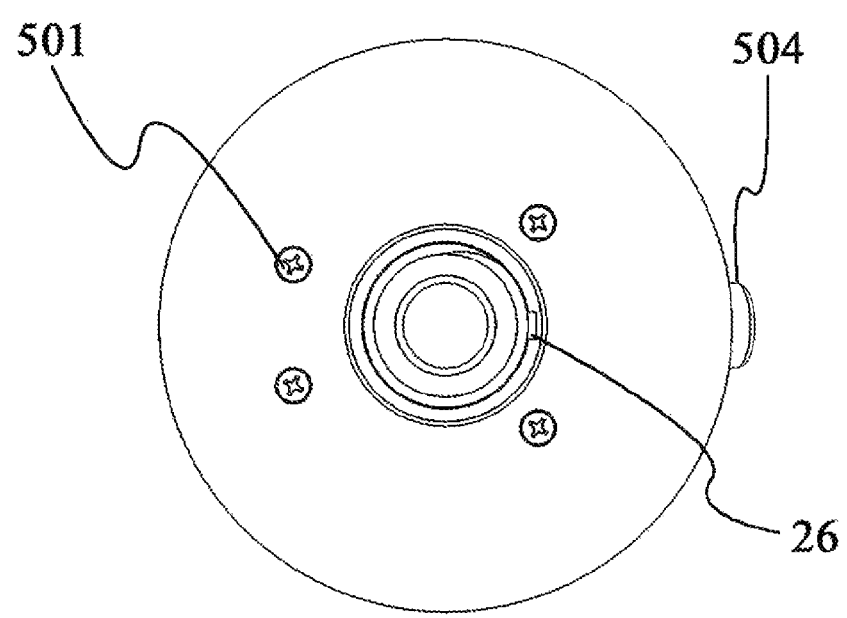
FIG. 34 is a bottom view of the device depicted in FIG. 29.

Referring now to FIG. 28, the second end of first POTP section (204) is associated with hollowing coupling (222). The inside diameter of coupling (222) including extension (224) is slightly less than the outside diameter of second POTP section (230) so that second POTP section (230) may slide freely through coupling (222).

A first end of second POTP section (230) is associated with a pneumatic piston (226) generally cylindrically shaped with a diameter slightly smaller than the inside of first POTP section (204) but slightly larger than second POTP section (230). As noted above for the POTP sections, pneumatic piston (226) is preferably constructed from low friction plastic materials such as polyethylene or Derin. Pneumatic piston (226) further defines a circumferential groove configured for receiving piston seal (228). For the preferred embodiment, piston seal (228) is a U-cup seal constructed from Buna-N rubber or other suitable materials known in the art to form a substantially air tight seal between two surfaces. Piston seal (228) forms a substantially air tight seal between the edges of pneumatic piston (128) and the inside surface of first POTP section (204). When second POTP section (230) is fully extended, surface (229) of pneumatic piston (228) comes in contact with extensions (224) to prevent piston (228) from leaving fist POTP section (204).

For the presently preferred embodiment, the second end of second POTP section (230) is associated with pneumatic coupling (222b) (see FIG. 26). The above description of pneumatic coupling (222) apply equally to pneumatic coupling (222b) except the various component sizes are slightly smaller to as required to allow third POTP section (240) to freely move within the telescoping support structure.

As noted above, since third POTP section (240) is the final support section (for the present embodiment), the second end of third POTP section (240) is associated with pneumatic end cap (202). Pneumatic end cap (202) forms a substantially air tight seal at the end of section (240) thereby completing the substantially air tight arrangement.

One of ordinary skill in the art will appreciate that when air is pump into access-port (212), a pressure is applied to pneumatic end cap (202) causing the third POTP section (240) to extend away from the first POTP section and second POTP section until pneumatic piston (226b) presses against coupling (222b). At this point, both third POTP section and second PTOP section start extending away from the first POTP section. When such sections move far enough, pneumatic piston (226) presses against coupling (222) and the PTOP sections are fully extended.

For the above embodiment, the system is always under pressure. When the air pressure is lost within the POTP sections, the sections collapse if there is a load present to collapse the sections. Alternative embodiments include configurations comprising a plurality of latching positions so that as the POTP sections extend, a latching device extends with the sections. If the air pressure is removed from the POTP sections, the latching device prevents the PTOP sections from collapsing. Many such latching devices are known in the art and a detail decision is not necessary to provide an enabling disclosure.

The inside of the POTP sections may be lubricated to help reduce wear due to friction and to help form a more air tight seal between the various components. Additionally, it should be appreciated that any number of POTP sections may be used.

Other means of applying an extending force to the various POTP sections is to include springs inside the POTP sections. Such springs take the place of the air and consequently the sealing components would not be necessary for such an embodiment and such sections would no longer be pneumatically operated telescoping pole sections; they would be spring loaded telescoping pole sections.

Support Structure—Adjustable Ventilator Jack

Figure 35:
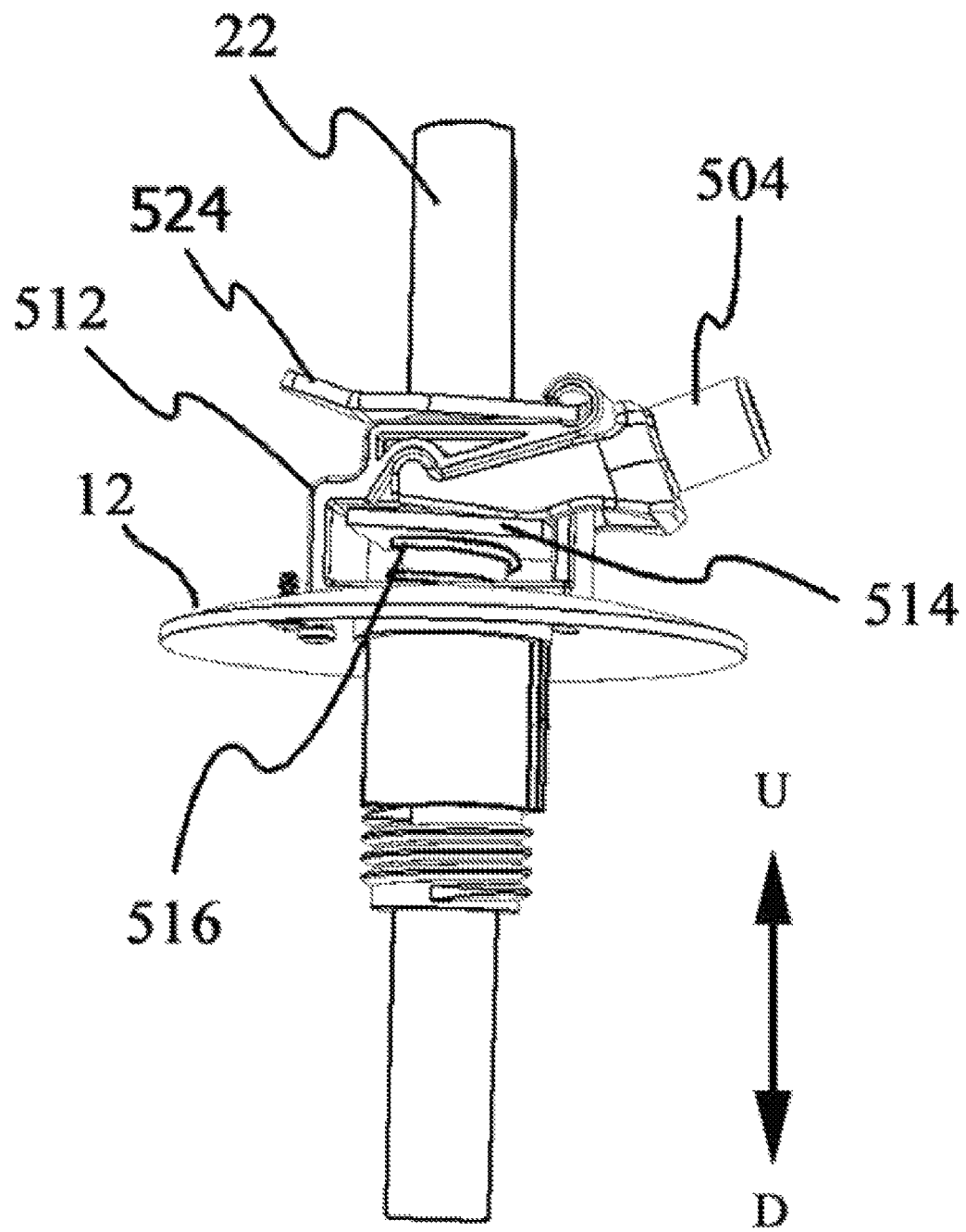
FIG. 35 is a side view of the device depicted in FIG. 29 with cover 502 removed.

Referring now to FIG. 29 through FIG. 36, one exemplary embodiment of an adjustable ventilator jack 500 is presented. As best seen in FIG. 35 (cover 502 has been removed), ventilator jack 500 comprises a modified dome (12) associated with a jack support (512). Jack support (512) may be integral to dome (12) or a separate component mechanically associated with dome (12). Jack support (512) is configured with a jack support interface configured to releaseably receive jack (504).

Jack (504) comprises a lever section (503) mechanically associated with a lever receiver (505). Lever receiver (505) is configured for receiving a leverage device such as a long bar. For the presently preferred embodiment, lever section (503) comprises a set of lever arms with each arm defining a lever surface (507), a leverage point (507e), and an opposing locking point (509). Locking points (509) are configured for being removably associated with locking point receivers (509a) defined by jack support (512). Additionally, lever arms of lever section (503) are suitably sized for being received by jack support (512) as depicted in FIG. 35. As shown, such lever arms define an inter-arm-space that is wide enough to allow support pole (22) to pass between the lever arms.

Figure 36:
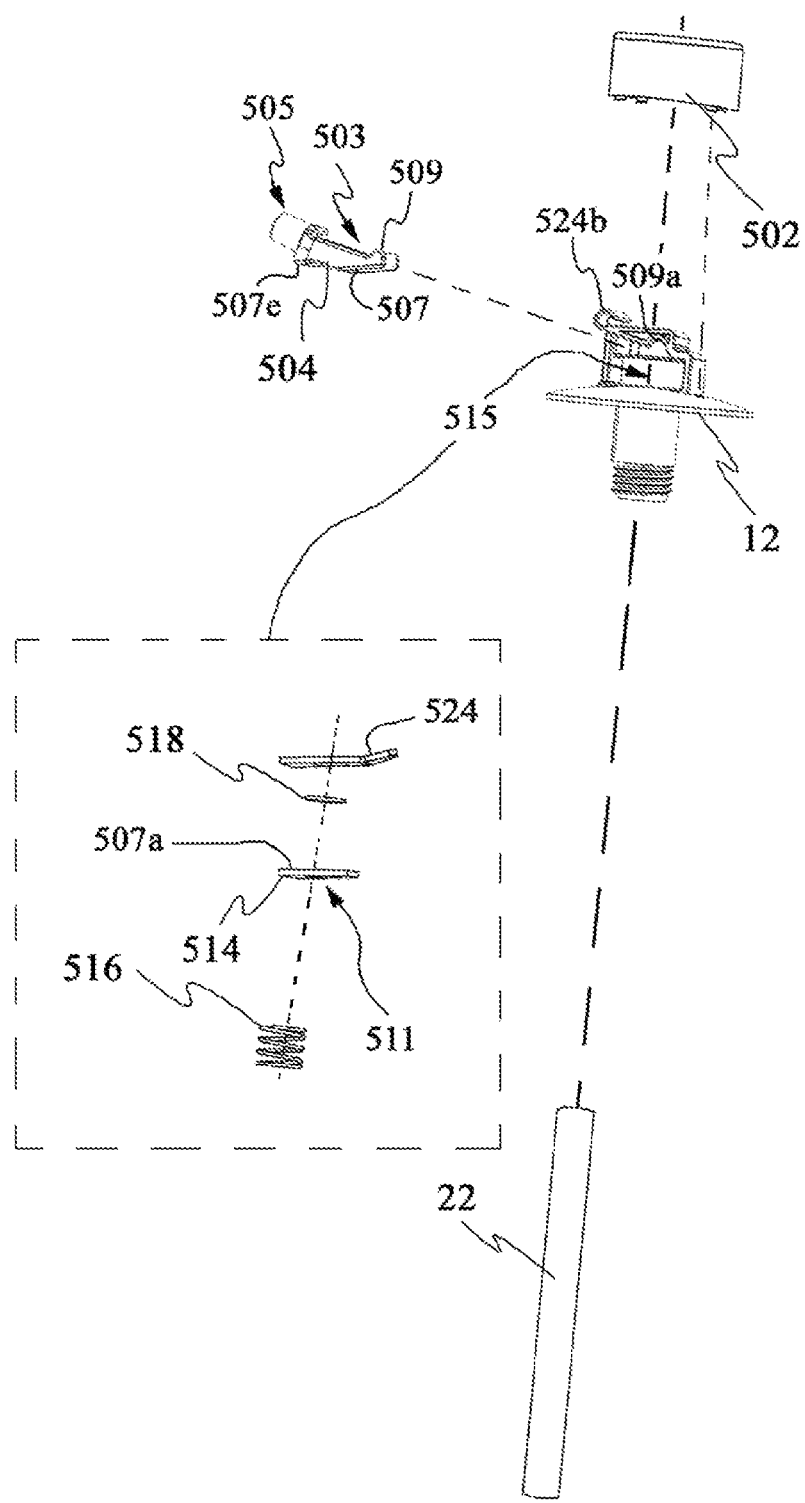
FIG. 36 is an exploded view of the device depicted in FIG. 29.

Lever surfaces (507) for each arm are configured for pressing against plate surface (507a) of pusher plate (514). As depicted in FIG. 36, pusher plate (514) defines a generally rectangular shape with a hole (511) defined there through. Pusher plate (514) is suitably sized for fifing between the lever arms of lever section (503) and hole (511) is suitably sized for receiving support pole (22) as best seen in FIG. 36b.

Figure 36B:
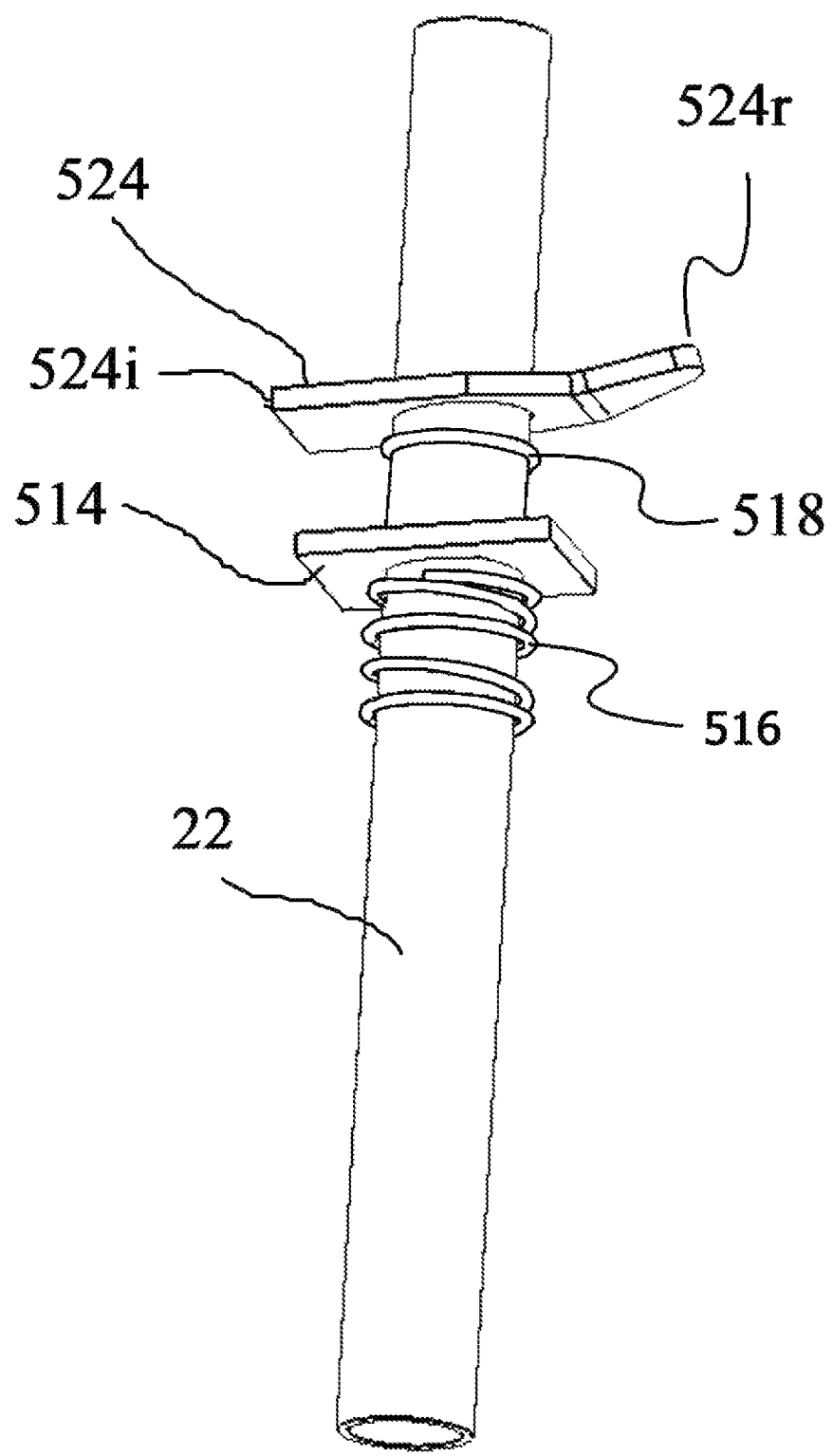
FIG. 36b is a side perspective view of a pusher plate associated with a spring, a o-ring, and a release, all associated with a support structure.

Referring now to FIG. 35, FIG. 36, and FIG. 36b, hole (511) of pusher plate (514) is further suitably sized for receiving support pole (22) associated with a bias spring (516). The pusher plate (51)/bias spring (516) combination is configured for fitting inside jack support void (515).

For the presently preferred embodiment, adjustable ventilator jack (500) further includes jack release (524). Jack release (524) defines a substantially flat rectangular section with an inclined edge, (i.e. release (524r)), defined at one end and a release interface (524i) defined at the opposing end. Jack release (524) further defines a hole at the approximate center suitably sized for receiving support pole (22). Additionally, release interface (524i) is suitably sized for being mechanically associating with jack support (512) r-interface (524b) as best viewed in FIG. 35.

The system my further include o-ring 518 configured for prevent liquid from running down support pole (22).

The operation of adjustable ventilator jack (500) is now considered. When no force is applied to lever receiver (505), bias spring (516) keeps pusher plate (514) in a substantially horizontal position. When a force is applied to lever receiver (505), and the force is in the "D" direction, leverage point (507e) presses down against a first end of plate surface (507a) compressing bias spring (516) and causing the opposing end of plate surface (507a) to rise in the U direction (i.e. pusher plate (514) is no longer substantially horizontal). When the force is removed from lever receiver (505), bias spring (516) forces the first end back level with the opposing end that by placing pusher plate (514) back to a substantially horizontal position. As such action is repeated, the pusher plate (514) will "climb" up support pole (22) thereby causing dome (12) to rise up support pole (22). One of ordinary skill in the art will appreciate that jack release (524) does not have a bias spring to keep it horizontal. Thus, jack release (524) will prevent dome (12) from sliding down support pole (12). Thus, when one wishes to cause dome (12) to travel down support pole (22), pressure is applied to release (524i).

Electronic Features

Alternative embodiments of the invention relate to electronically enabled cover ventilators and support structures. One exemplary embodiment of such a configuration is presented in block diagram form in FIG. 37. For the presently preferred embodiment, an electronic module is associated with one of the support structure or the ventilator. For the preferred embodiment, the electronic module is disposed within the ventilator.

The electronic module comprises a controller (300) electrically associated with at least one of a communication device (302), support structure height adjustment device (304), a tamper sensor (306), a signaling device (308), a visual sensor (310), an environment sensor (312), and an audio sensor (314). The electronic module may be connected to an external power source or may include its own power source (or both) for supplying the various components with power.

Figure 37:
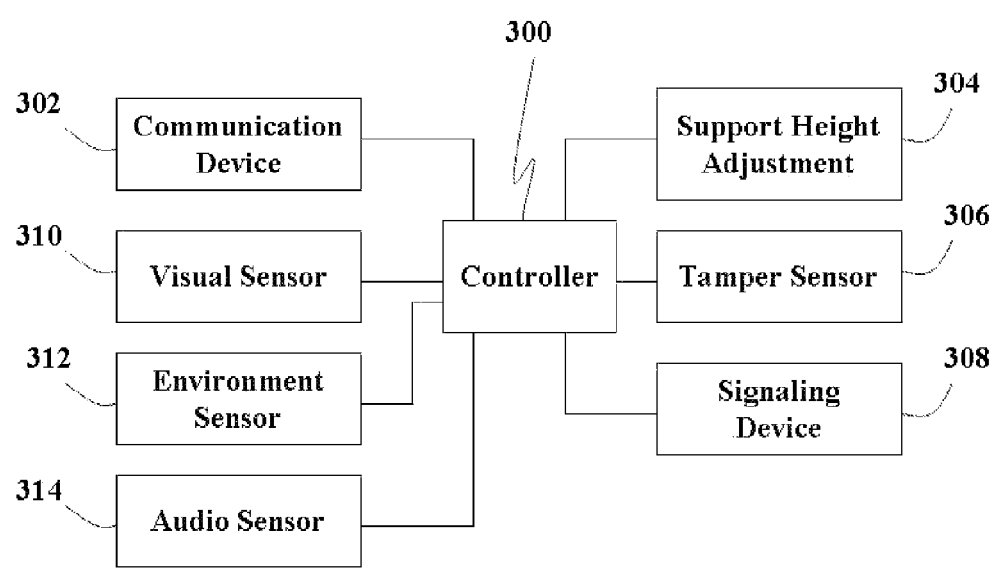
FIG. 37 is a block diagram representation of one possible embodiment of the electronic elements of an alternative embodiment of the invention comprising electronics controls and functions.
Figure 38:
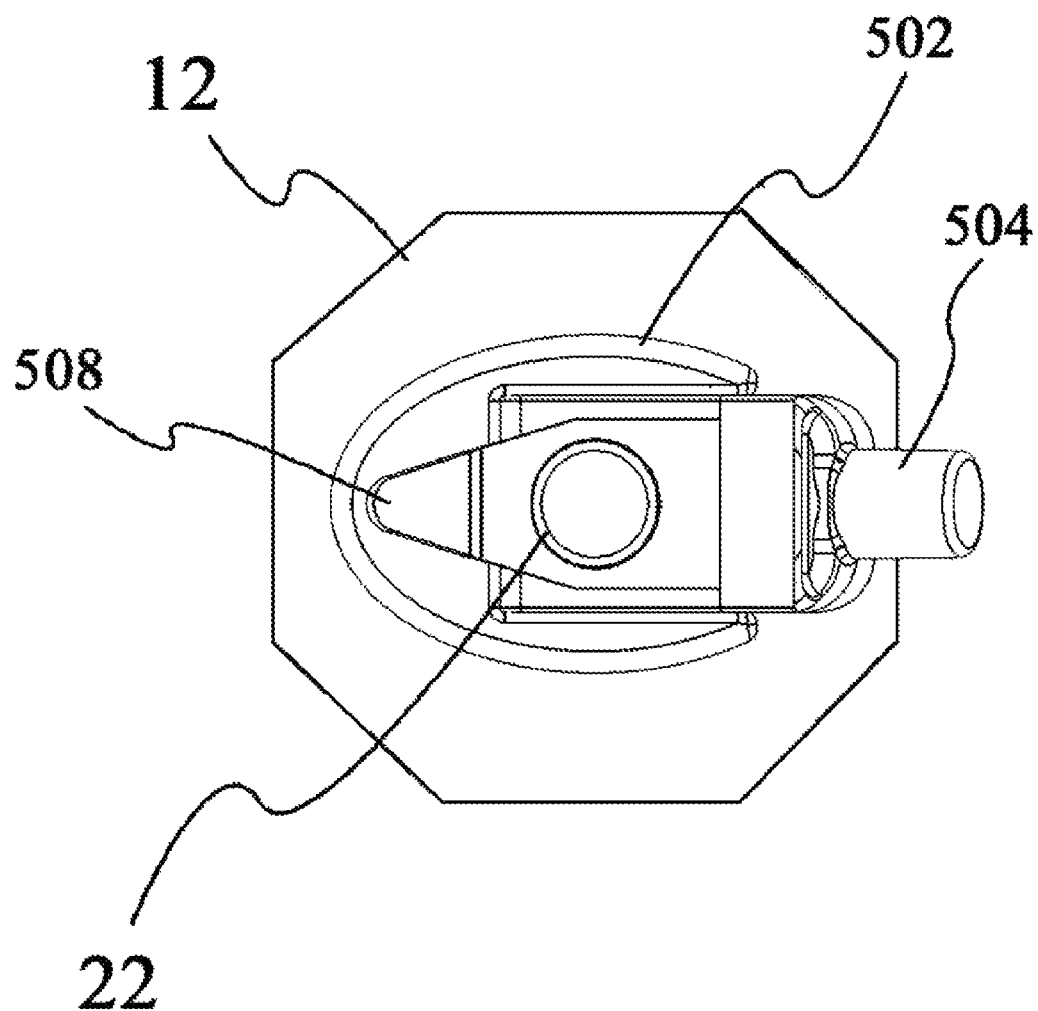
FIG. 38 is a top view of one possible embodiment of a dome portion defining a polygonal umbrella shape.

For the preferred embodiment, the functional blocks of FIG. 37 represent ASSPs (Application Specific Standard Product), Complex Programmable Logic Devices (CPLD), ASICs (application specific integrated circuit), microprocessors, or PICs or links to devices that perform the identified function. In addition, one or more functional blocks may be integrated into a single device or chip sets such as ASSP chip sets.

Manufactures of suitable ASSP devices include Motorola, and Texas Instruments. While most of the functions are preferably performed by ASSP chip sets, Complex Programmable Logic Devices (CPLD) may be used to interface the various ASSP blocks to the system buss allowing one system component to interface with another component. Manufactures of suitable CPLD devices include Lattice's (ispMACH 4000 family) and (Altera's MAX 7000-series CPLD).

For the presently preferred embodiment of the invention, controller (300) is configured to perform various tasks including data management, data storage, data transfers, resource monitoring, and system monitoring depending on the device configuration. Controller (300) is preferably a simple PIC (such as the ones manufactured by MicroChip). Other technologies that may be used include ASICs (application specific integrated circuit) and ASSPs (application specific standard product). Controller (300) may comprise onboard ROM, RAM, EPROM type memories. In addition, external memory may be electrically associated with controller (300).

For the presently preferred embodiment, the controller (300) is associated with a pneumatic based support structure such as the one described above. An air source is mechanically associated with the pneumatic support structure and electrically associated with controller (300). Controller (300) is configured to receive movement signals via communication device (302). Controller (300) then generates the corresponding control signals that are transferred to support height adjustment (304) which in turn adjusts the height of the support structure.

Exemplary communication device circuitry is now considered. For one embodiment, relatively long range wireless communication circuitry includes an RF transceiver configured to transmit and receive data signals to/from a remote electronic device. It should be noted that embodiments where such communication circuitry comprises only a transmitter or only a receiver fall within the scope of the invention. For one embodiment, communication device (302) comprises a transceiver including a relatively low power transmitter that transmits a data signal in an unlicensed frequency band. Other embodiments include a relatively longer range transmitter comprising any number of well known technologies for wireless communications transmitting at a legal power level. For example, the transceiver may be configured to communicate over GPRS, GSM, GPRS, 3G, and EDGE enabled networks as well as WAP networks.

For low powered embodiments, communication device (302) comprises a transceiver configured with a low power transmitter. Such a low powered transceiver operates in an unlicensed band although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. Low power communication device (302) is configured for short range communication with other suitably configured devices such as wireless sensors, wireless devices such as a Bluetooth enabled pneumatic pump, remote control devices, and remote programming devices. In addition, such communication device may be (paired) with a second device associated with the vehicle being covered. In such configuration, controller 300 is configured to transmit and/or receive signals to the second device. The second device would preferably be configured with relatively longer range communication capabilities thereby allowing information to be transmitted to/from controller 300 over greater distances without requiring the electronically enabled cover ventilator to include relatively high power (and thus power hungry) communication circuits.

Visual sensor (310) is electrically associated with controller (300) and is configured for acquiring and transferring images as directed by controller (300) or an on board controller. For the preferred embodiment, visual sensor (310) is configured to support CMOS image input sensors such as the one manufactured by Micron® and/or CCD (charge-coupled device) image input sensors such as the ones manufactured by ATMEL® sensors. Visual sensor (310) performs the necessary processing functions to convert the imaging data into a desired format before transferring such data.

Attention now is directed to audio sensor (314). For the preferred embodiment, audio sensor (314) comprises speaker and a microphone electrically associated with an audio codex. Audio sensor (314) is configured for detecting sound waves and converting such waves into digital data of a predefined format such as MP3. Sound waves may also be generated by audio sensor (314) using the speaker to issue, for example, warnings and provide for other forms of communications.

The electronic module further comprises environment sensor (312) which may comprise any number of sensors configured to sense an environmental parameter. Suitable environment sensors include temperature, height, humidity, water, pressure and location sensors. Environment sensor (312) may further comprise a universal interface for being electrically associated with a variety of appropriately configured sensors.

For one embodiment the environment sensor (312) that generates location data, environment sensor (312) includes a GPS (global positioning system) device. The GPS device is one embodiment of a position-finder electrically associated with a controller wherein the GPS device is configured to generate position-data for the location of electronic module.

For one embodiment, controller (300) is configured to monitor the location of the electronic module. Controller (300) stores the location data for the electronic module's current location and then periodically monitors (periodic at equal intervals, unequal intervals, random intervals) the controller's real time location to determine if the real time location data has changed or is changing from the stored location data. If the real time location data is determined to have changed form the stored location data by a predefined amount, controller (300) may then execute one or more predefined movement-detected-routines. Such routines many include any of the following: (1) activating a signaling device; (2) activating the audio sensor to record sound data and/or to generate a sound message; (3) activating the visual sensor to record image data; (4) activate the communication device to transmit a message to a remote location such as the owner or police. Other routines may also be developed as needed.

Controller (300) may further be configured to monitor the height of the support structure using a height sensor. One suitable height sensor is a simple rheostat that changes value as the height of the support structure is varied. The change in resistance value is correlated to the height of the support structure. When a user wishes to move the support structure to a desired height, a communication signal is transferred to the controller (300). Controller (300) then checks the value of the height sensor and generates the appropriate control signals that are transferred to height adjustment circuit (304). If the desired height is a simple direction signal (i.e. move up, or move down), controller (300) generates the appropriate control signals to generated the desired movement for as long as the direction signal is detected or a mechanical limit is reached.

For another embodiment of the invention, controller (300) monitors the pressure inside the pneumatic based support structure. For this embodiment, a pneumatic pressure sensor is associated with the support structure and configured to generate pressure data based on the air pressure within the pneumatic support structure. Predefined maximum and minimum pressure threshold values are stored in a memory associated with controller (300). When controller (300) determines that the pressure within the support structure is outside the pressure threshold, controller (300) generates the appropriate control signals that are transferred to height adjustment circuit (304) to bring the pressure within the support structure back to the approximate middle of the threshold values.

Controller (300) may further be configured to monitor the support structure environment for water. For example, the support structure may be used to hold up a cover ventilator associated with a boat cover. A water sensor is associated with the support structure or positioned in the boat and electrically associated with controller (300). For example, the water height sensor may be Bluetooth enabled and transmit water level data to controller (300). When controller (300) receives water height data it compares such data to stored water height data that is associated with an action routine. An action routine is any routine that is executed by some device upon the detection of an event or condition. For this particular application, controller (300) may activate a water pump to pump the water out of the boat. Such water pump may be the boats water pump or another pump electrically associated with controller (300). Another action routine would be to use communication device (302) to transmit a signal containing water height data or a warning message to a remote location.

Similarly, other sensors such as temperature and humidity may be associated with controller (300). Preferably, for each sensor, there is stored threshold data that is used by controller or the sensor to determine if a predefined condition exists. Such threshold data is further associated with at least one action routine that is to be executed when a predefined condition is detected.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A ventilator for ventilating a cover, said ventilator comprising:
    a dome comprising a dome portion and a depending shaft portion wherein said dome portion defines one of (a) a generally circular umbrella shape, and (b) a polygonal umbrella shape, wherein a center of said dome portion is the upper most portion and wherein an outer surface of said dome portion curves in a downward direction extending away from said center to a predefined distance thereby defining a dome-outer-perimeter;
    wherein said shaft portion extends downwardly from the center of said dome portion, said shaft portion defining a shaft interface suitably sized to receive a support structure;
    two ventilator plates, wherein each ventilator plate comprises two opposed surfaces defining a plate hole there through in the approximate center, said plate hole defining a shaft receiver suitably sized to receive said shaft portion, wherein said opposed surfaces extend away from said shaft receiver to a predefined point thereby defining an plate-outer-perimeter;
    wherein one side of each said ventilator plate defines a gripping-surface and the opposing side of said ventilator plate defines a gusset-surface;
    wherein each ventilator plate further defines a vent section disposed at least partially around said shaft receiver, said vent section defining at least one air passage, where said air passage extends beyond the gusset-surface thereby defining a vent height;
    wherein said gusset-surface defines a plurality of gusset supports extending perpendicularly from the gusset-surface to a predefined gusset-height that is one of (a) a equal to said vent height and (b) less than said vent height, and further extending outward from said vent section toward said plate-outer-perimeter;
    wherein said gripping-surface defines an annular gripping region wherein said annular gripping region defines an outer-gripping-diameter and an inter-gripping-diameter, and wherein a plurality of gripping-strips extend along said annular gripping region from the inter-gripping-diameter to the outer-gripping-diameter wherein each adjacent said gripping-strip is separated by a non-gripping-strip section;
    a seam-channel running from a first outer-gripping-diameter point and along said gripping-surface to a second outer-gripping-diameter point, wherein said seam-channel is free of gripping-strips; and
    a fastening device configured to mechanically associate the ventilator plates and dome so that they clamp together wherein the gripping regions of said ventilator plates are engaged each other, and the seam-channels of said ventilator plates are aligned for clamping the cover therebetween.

2. A ventilator for ventilating a cover as in claim 1, wherein said shaft interface defines a blind axial opening.

3. A ventilator for ventilating a cover as in claim 2, wherein an outer diameter of said shaft portion defines a first-shaft-diameter and a larger second-shaft-diameter thereby defining flanged surface there between.

4. A ventilator for ventilating a cover as in claim 3, wherein in at least one axial key extends along at least a portion the length of said smaller first-shaft-diameter.

5. A ventilator for ventilating a cover as in claim 4, wherein said fastening device is a nut and wherein said depending shaft further defines screw threads at the bottom of said smaller first-shaft-diameter configured for receiving said nut.

6. A ventilator for ventilating a cover as in claim 2 wherein said ventilator plates are interchangeable so that a portion of said gusset-surface of either of said two plates are configured to associate with said flanged interface.

7. A ventilator for ventilating a cover as in claim 1, wherein one of said two venerator plates is integral to said dome.

8. A ventilator for ventilating a cover as in claim 1, wherein said dome-outer-perimeter extends beyond said plate-outer-perimeter.

9. A ventilator for ventilating a cover as in claim 1, wherein at least one of said non-gripping-strip section of one said ventilator plate is an alignment-tooth, and at least one of said non-gripping strip section of another one said ventilator plate is an alignment-tooth receiver for receiving said alignment-tooth respectively.

10. A ventilator for ventilating a cover as in claim 9, wherein said gripping-region comprises thirty gripping-strips.

11. A ventilator for ventilating a cover as in claim 10, wherein said gripping region is divided by said seam-channel.

* * * * *